(12) United States Patent
Yamada et al.

(10) Patent No.: US 6,819,714 B2
(45) Date of Patent: Nov. 16, 2004

(54) VIDEO ENCODING APPARATUS THAT ADJUSTS CODE AMOUNT BY SKIPPING ENCODING OF IMAGE DATA

(75) Inventors: Nobuhiko Yamada, Anjyo (JP); Masahiro Morishita, Tajimi (JP); Tsuyoshi Isomura, Ena (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 764 days.

(21) Appl. No.: 09/838,432

(22) Filed: Apr. 19, 2001

(65) Prior Publication Data

US 2001/0046263 A1 Nov. 29, 2001

(30) Foreign Application Priority Data

Apr. 20, 2000 (JP) .................................. 2000-118982

(51) Int. Cl.[7] .................................................. H04N 7/12
(52) U.S. Cl. ............. 375/240.12; 375/240; 375/240.01; 375/240.03; 375/240.12; 375/240.17; 375/240.25
(58) Field of Search ........................... 375/240, 240.01, 375/240.03, 240.12, 240.17, 240.25; 382/236; 348/414.1

(56) References Cited

U.S. PATENT DOCUMENTS

| | | | | |
|---|---|---|---|---|
| 5,689,307 A | 11/1997 | Sugahara et al. | ........ | 348/419.1 |
| 6,031,937 A | * 2/2000 | Graffagnino | ................ | 382/236 |
| 6,125,144 A | * 9/2000 | Matsumura et al. | ... | 375/240.12 |
| 6,414,996 B1 | * 7/2002 | Owen et al. | ........... | 375/240.17 |
| 6,430,222 B1 | * 8/2002 | Okada | ................... | 375/240.03 |
| 6,490,324 B1 | * 12/2002 | McDade et al. | ........ | 375/240.25 |

FOREIGN PATENT DOCUMENTS

| | | |
|---|---|---|
| JP | 1042295 | 2/1998 |
| JP | 2871316 | 1/1999 |

* cited by examiner

*Primary Examiner*—Gims Philippe
*Assistant Examiner*—Allen Wong

(57) ABSTRACT

A comparing/judging unit 125 of a video encoding apparatus compares, prior to encoding each image data, the predictive amount of codes accumulated in a receiver buffer of a decoding apparatus with a threshold that is set for a picture type of a picture to be obtained by encoding the image data. The comparing/judging unit 125 judges, when the predictive amount in the receiver buffer is below the threshold, that encoding the image data is to be skipped, and makes the DCT unit 113 cancel the encoding process. The comparing/judging unit 125 then outputs an all-skip picture in which all macroblocks except a first macroblock and a last macroblock in each slice layer are skipped macroblocks from a SKIP picture storage memory 126.

23 Claims, 23 Drawing Sheets

D1,D2:AMOUNT OF GENERATED BITS

FIG. 2A
NORMAL
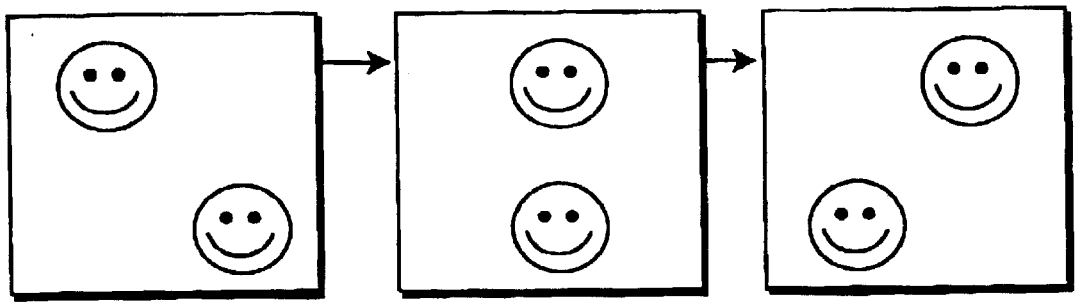
FIG. 2B  SKIPPED MACROBLOCK USED
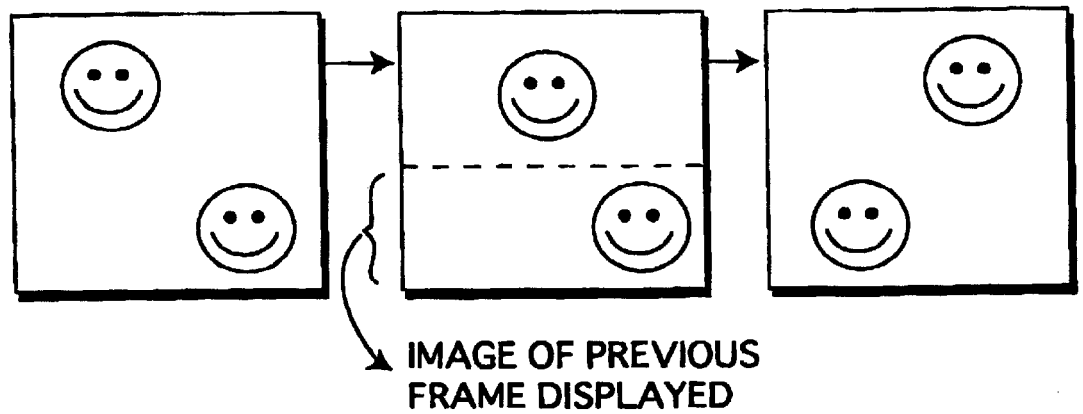
↘ IMAGE OF PREVIOUS
FRAME DISPLAYED
FIG. 2C  PSEUDO IMAGE USED
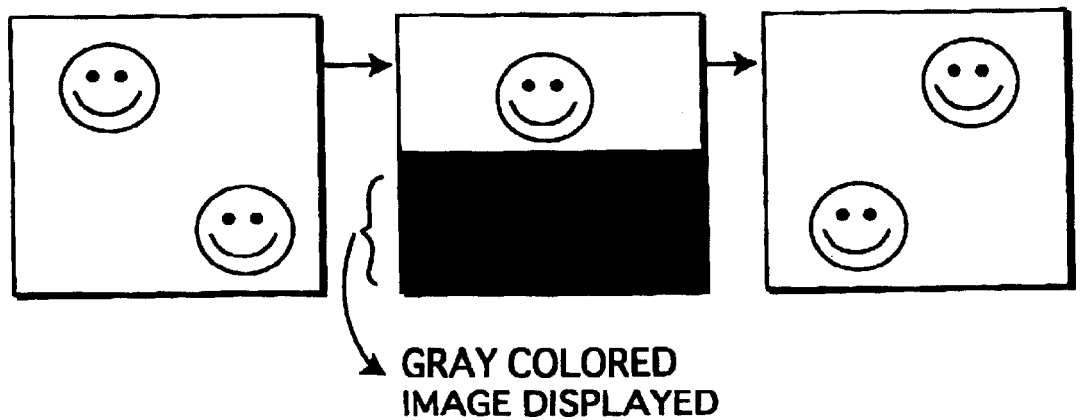
↘ GRAY COLORED
IMAGE DISPLAYED

NORMAL

DISPLAY ORDER : 1t→1b→2t→2b→3t→3b→4t→4b

PICTURE SKIPPED

DISPLAY ORDER : 1t→1b→1t→1b→3t→3b→1t→4t→4b

REVERSED TEMPORALLY

ORIGINAL ORDER OF IMAGES

ORDER OF IMAGES TO BE ENCODED

FIG.9
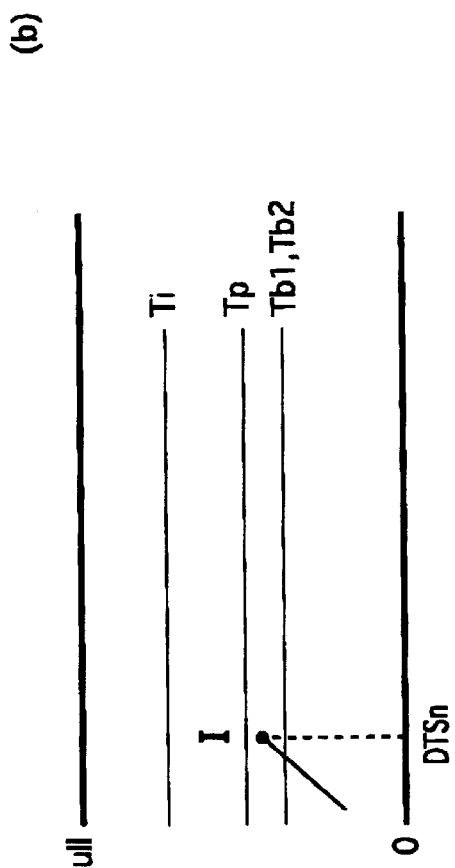
(a)
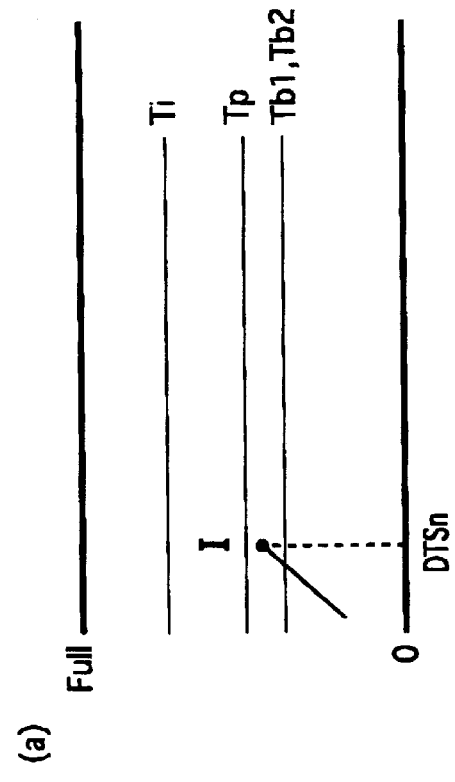
(c)
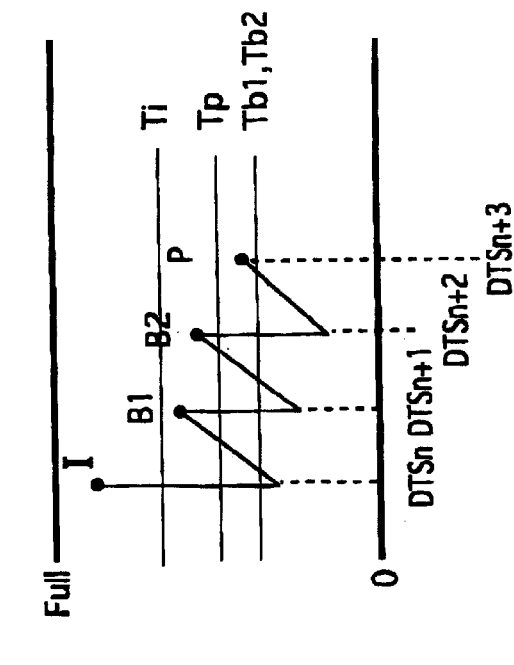
(b)
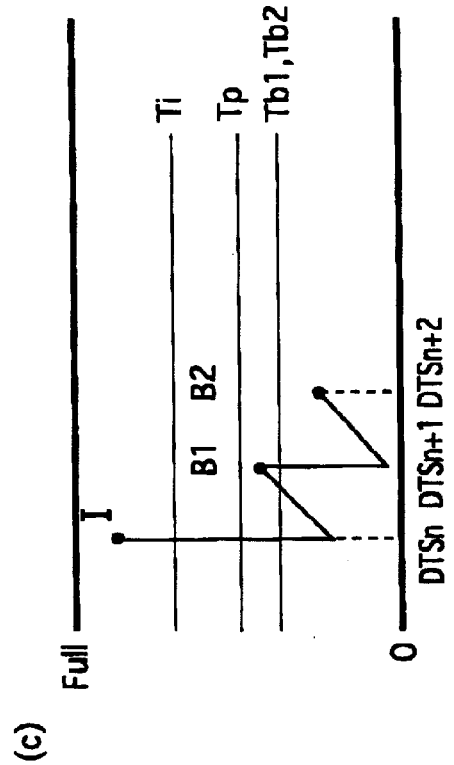
(d)

NORMAL

PICTURE SKIPPED

FIG.12

$Ti = Ei$ $Tp = Ep$ $Tb2(p) = Eb + (Ep-R)$     $(Ep-R) \geqq 0$ $\phantom{Tb2(p)} = Eb$     $(Ep-R) < 0$ $Tb1(p) = Eb + (Tb2(p)-R)$     $(Tb2(p)-R) \geqq 0$ $\phantom{Tb1(p)} = Eb$     $(Tb2(p)-R) < 0$ $Tb2(i) = Eb + (Ei-R)$     $(Ei-R) \geqq 0$ $\phantom{Tb2(i)} = Eb$     $(Ei-R) < 0$ $Tb1(i) = Eb + (Tb2(i)-R)$     $(Tb2(i)-R) \geqq 0$ $\phantom{Tb1(i)} = Eb$     $(Tb2(i)-R) < 0$

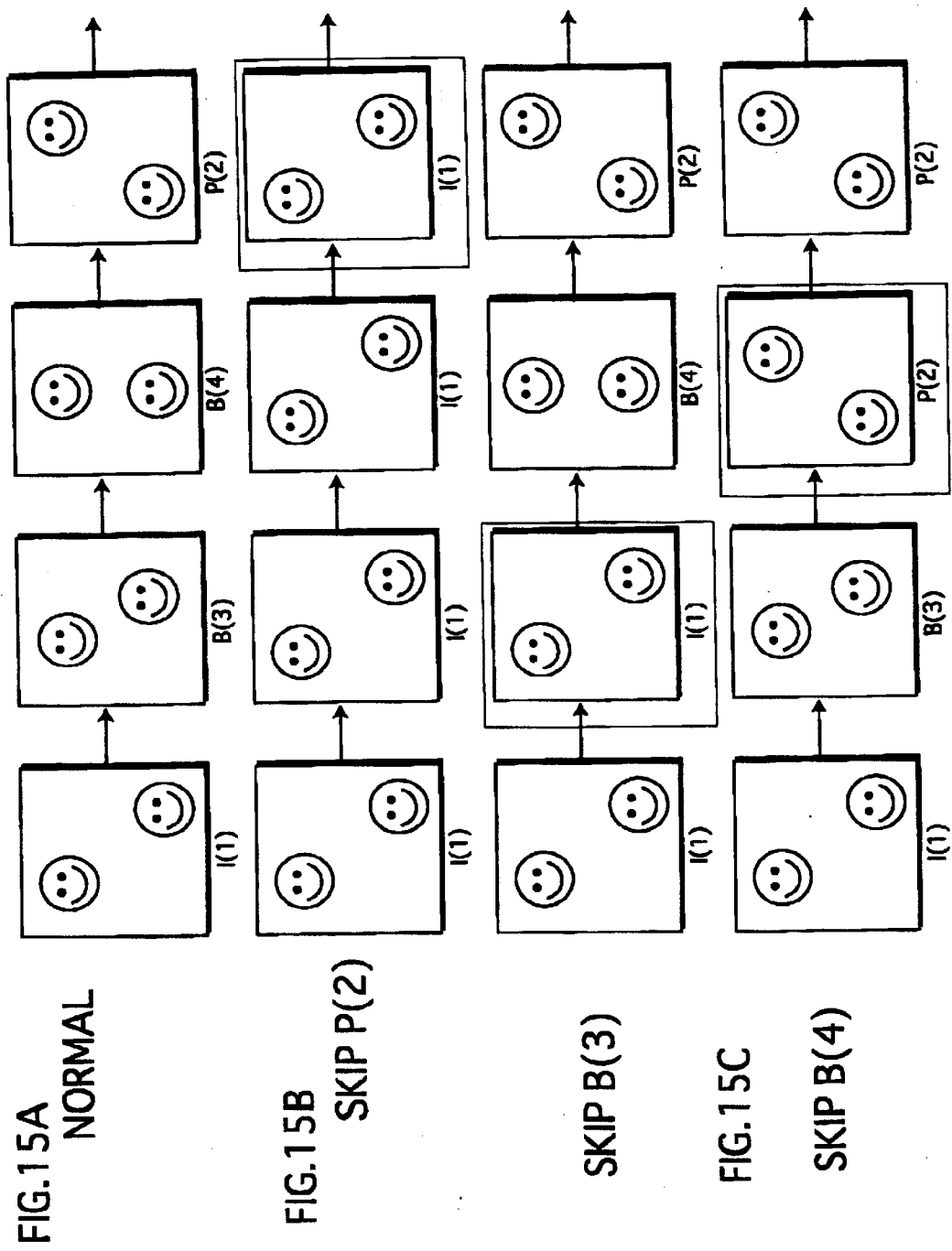

FIG. 16

$Ti = Ei$ $Tp = Ep$ $Tb2(p) = Eb + (Ep - R)$         $(Ep - R) \geqq 0$ $= Eb$                     $(Ep - R) < 0$ $Tb1(p) = Dbskip + (Tb2(p) - R)$   $(Dbskip + (Tb2(p) - R)) \geqq Eb$ $= Eb$                     $(Dbskip + (Tb2(p) - R)) < Eb$ $Tb2(i) = Eb + (Ei - R)$          $(Ei - R) \geqq 0$ $= Eb$                     $(Ei - R) < 0$ $Tb1(i) = Dbskip + (Tb2(i) - R)$    $(Dbskip + (Tb2(i) - R)) \geqq Eb$ $= Eb$                     $(Dbskip + (Tb2(i) - R)) < Eb$

FIG. 18

BIT STREAM STRUCTURE (B-PICTURE) OF MPEG2

Picture header temporal_reference picture_coding_type=3(I=1、P=2、B=3)

vbv_delay=65535 full_pel_forward_vector=0 forward_f_code=7 picture coding extension forward horizontal f_code=2 forward vertical f_code=2 forward horizontal f_code=15 forward vertical f_code=15 intra_dc_precision=0

| picture_structure=1(TopField=1,BottomField=2,Frame=3) |   1 top_field_first=0 frame_pred_frame_dct=0 concealment_motion_vectors=0 q_scale_type=1 intra_vlc_format=0 alternate_scan=0 repeat_first_field=0 chroma_420_type=0 progressive_frame=0 composite_display_flag=0

VIDEO ENCODING APPARATUS THAT ADJUSTS CODE AMOUNT BY SKIPPING ENCODING OF IMAGE DATA

BACKGROUND OF THE INVENTION (1) Field of the Invention

The present invention relates to a video encoding apparatus and particularly to the video encoding apparatus that adjusts the amount of codes by skipping encoding of image data.

(2) Related Art

In video encoding according to the MPEG standards, the amount of codes is controlled by predicting the amount of pictures to be accumulated in a receiver buffer of a decoding apparatus. This is referred to as control of the code amount performed by the Video Buffering Verifier (VBV) model.

FIG. 1A shows changes of the predictive accumulation amount of the receiver buffer. As shown in the figure, pictures are inputted in the receiver buffer at a predetermined bit rate. At the time indicated by DTS (Decoding Time Stamp), one picture is outputted from the receiver buffer for being decoded. If the decoding apparatus has a display unit adopting NTSC (National Television System Committee) format, DTS is set at every 1/30 seconds when one frame is allocated to one picture, and when one field is allocated to one picture, DTS is set at every 1/60 seconds. Also, if the decoding apparatus has a display unit adopting PAL (Phase Alternation Line) format, DTS is set at every 1/25 seconds when one frame is allocated to one picture, and when one field is allocated to one picture, DTS is set at every 1/50 seconds.

Normally, when D1 denotes the amount of bits generated for decoding a picture at DTS1, the predictive accumulation amount of the receiver buffer decreases from V1 to V1* (=V1−D1) at DTS1 as shown in FIG. 1A.

The VBV model controls the amount of codes so that the predictive accumulation amount of the receiver buffer does not cause an overflow or an underflow.

In some circumstances, i.e. during scene changes, an underflow of the receiver buffer may occur due to a sequence of pictures which each require a large amount of bits, as shown in FIG. 1B. When D3 denotes the amount of bits generated for decoding a picture at DTS3, the predictive accumulation amount of the receiver buffer is below zero at DTS3 since V3−D3<0. This phenomenon happens because the picture to be decoded at DTS3 is yet to be inputted in the receiver buffer. To avoid such an underflow of the receiver buffer, the quantization scale is increased so as to decrease the generation bit amount.

On the other hand, an overflow of the receiver buffer may occur due to a sequence of pictures which each require a small amount of bits, as shown in FIG. 1C. When the predictive accumulation amount of the receiver buffer prior to decoding at DTS3 is V3 (=V2*+R, where R is the amount of bits inputted into the receiver buffer of the decoding apparatus, in other words, the amount of bits transmitted from the encoding apparatus to the receiver buffer, during each time interval of DTS (the time interval between decoding of two consecutive pictures)), V3 exceeds the storage capacity of the receiver buffer. To avoid such an overflow of the receiver buffer, the quantization scale is decreased so as to increase the generation bit amount.

However, when the generation bit amount is significantly decreased by increasing the quantization scale to prevent an underflow, image quality will be deteriorated. To prevent such deterioration, the following methods are conventionally employed along with the adjustment of the quantization scale.

The first method uses so called skipped macroblocks. According to the MPEG standards, encoding is performed on a macroblock basis, the macroblock being a block of 16×16 pixels. A skipped macroblock is a macroblock composed of a special code indicating to display an image that is identical to the reference image at the location, and its data amount is extremely small. Accordingly, when an underflow is likely to occur, skipped macroblocks are transmitted instead of performing normal encoding of the original image.

However, the above method is problematic because a macroblock that is not a skipped macroblock shows a part of the original image, and a skipped macroblock shows a part of the reference image, which makes the reconstructed image lack in consistency as a whole.

FIG. 2A shows examples of images displayed in a normal case.

FIG. 2B shows examples of images displayed when a skipped macroblock is used. In FIG. 2B, as a skipped macroblock is not used for the upper macroblock of the second frame, a part of the original image of the second frame is displayed in the upper macroblock. On the other hand, as a skipped macroblock is used for the lower macroblock of the second frame, a part of an image displayed in the lower macroblock of the first frame is also displayed in the lower macroblock of the second frame. This makes the reconstructed image in the second frame lack in consistency as a whole.

The second method is to encode pseudo image data. Pseudo image data is image data whose pixel values are medians of possible pixel values. As one example, when a pixel value is expressed in eight-bit, its median is 128. According to the MPEG standards, the difference between each pixel value of the image data and its median is encoded, and so the amount of data resulting from encoding such image data whose pixel values are medians becomes minimum. Accordingly, when an underflow is likely to occur, on a macroblock basis, image data of the macroblock whose pixel values are medians may be encoded instead of performing normal encoding on the macroblock.

However, the problem with the above method is that a gray-colored image is displayed where the image data whose pixel values are medians has been encoded.

FIG. 2C shows examples of images displayed when a pseudo image is used. In the second frame, a part of the original image is displayed in the upper macroblock since normal encoding has been performed thereon. On the other hand, a gray-colored image is displayed in the lower macroblock where pseudo image data has been encoded. This makes the reconstructed image in the second frame lack in consistency as a whole.

By the way, Japanese Patent No. 2871316 discloses a method for skipping encoding of image data of one field or one frame (hereafter referred to as "skipping a picture") FIG. 3 shows the construction of a video encoding apparatus disclosed in Japanese Patent No. 2871316. Referring to the overall construction of this video encoding apparatus, input moving image data is subjected to an encoding process performed by an orthogonal transformation circuit 6 and other units, and generated pictures are stored in a buffer memory 20. When a transmission rate excess judging circuit 24 judges that a transmission rate of each picture exceeds a predetermined threshold, a SKIP code stored in a SKIP code storage memory 22 is outputted, or when the judgment result of the transmission rate excess judging circuit 24 is negative, the picture stored in the buffer memory 20 is outputted.

According to the method described above, when a picture is to be skipped, not only macroblocks occupying a part of the picture but also all the macroblocks except a first and a last macroblock in each slice layer are replaced with skipped macroblocks. This enables a decoding apparatus to display an image that is identical to a previously decoded image, avoiding displaying such an image that lacks in consistency as described above.

However, the above method has the following problems.

The first problem is that the buffer memory 20 shown in FIG. 3 is necessary for temporarily storing generated pictures for the judgment whether the amount of each generated picture exceeds the transmission rate. In more detail, when the judgment is performed on each macroblock as to whether encoding an image of each macroblock is to be skipped as described above, a buffer with a small capacity can be provided for storing data encoded on a macroblock basis. However, with the present method, each picture as a whole is subjected to the judgment as to whether the picture is to be skipped, which requires a buffer with a large capacity for storing encoded data of all the macroblocks included in the picture.

The second problem is that there is a case where the order of images displayed in an interlaced scan format is reversed when some of the pictures are skipped, in a case where one frame is allocated to one picture (frame structure).

FIG. 4A shows images displayed in a normal case where no picture is skipped. Reference numerals 1t and 1b respectively represent a top field and a bottom field of the first frame. In the frame structure, an encoding process is performed on a frame basis, each frame being composed of a top field and a bottom field. In this case, the decoding apparatus performs a decoding process on one frame at every 1/30 seconds. As the interlaced format is applied to its display, one field is displayed at every 1/60 seconds. That is to say, fields 1t, 1b, 2t, 2b, 3t, 3b, 4t, and 4b are displayed in the stated order.

FIG. 4B shows images displayed in a case where a picture is skipped.

When skipping occurs to a picture B(3) in the frame 2, an image identical to the picture I(1) that is referred to by the picture B(3) is displayed in the frame 2 where the original image is encoded to be the picture B(3).

Accordingly, the top field of the frame 2 displays the same image as the top field 1t of the frame 1. The bottom field of the frame 2 displays the same image as the bottom field 1b of the frame 1. As they are displayed in the interlaced format, the fields 1t, 1b, 1t, 1b, 3t, 3b, 4t, 4b are displayed in the stated order respectively at 1/60 seconds. In this way, the field it is displayed after the field 1b, causing a reversal in the display order of.

SUMMARY OF THE INVENTION

In view of the above problems, the object of the present invention is to provide a video encoding apparatus that makes a special buffer for the judgment whether a whole picture is to be skipped unnecessary and that does not cause a reversal in the display order of images even when a whole picture is skipped.

The above object can be achieved by a video encoding apparatus that encodes a sequence of image data while predicting an accumulation amount of a receiver buffer in a decoding apparatus, each image data forming one frame or one field, the video encoding apparatus including: a comparing unit for comparing, prior to encoding of each image data, a predictive accumulation amount with a predetermined threshold, the predictive accumulation amount being an amount of data predicted to be accumulated in the receiver buffer by the time when data obtained by encoding the image data is decoded; and skipping unit for (a) canceling the encoding of the image data and (b) using a proxy code as data that is fetched from the receiver buffer at the decoding time, if the amount of data is below the predetermined threshold, the proxy code indicating to display image data that is identical to previously decoded image data.

With this construction, the judgment as to whether encoding of each image data is to be skipped or not is performed prior to the encoding of the image data, and so a special buffer for temporarily storing encoded data of the image data for the judgment as to whether the predictive accumulation amount of the receiver buffer is below a threshold becomes unnecessary.

Here, the video encoding apparatus may further include a threshold setting unit for setting a threshold for a picture type of a picture that is obtained by encoding the image data, the picture type being one of an I-picture, a P-picture, and a B-picture With this construction, an appropriate threshold for each picture type can be set in consideration of a different code amount due to a different encoding method of each of an I-picture, a P-picture, and a B-picture.

Here, the skipping unit (a) uses an all-skip B-picture as the proxy code when the picture type is a B-picture, the all-skip B-picture being a B-picture in which macroblocks in all slice layers except a first macroblock and a last macroblock in each slice layer are skipped macroblocks, and (b) uses an all-skip P-picture as the proxy code when the picture type is an I-picture or a P-picture, the all-skip P-picture being a P-picture in which macroblocks in all slice layers except a first macroblock and a last macroblock in each slice layer are skipped macroblocks.

With this construction, using skipped macroblocks of MPEG, a proxy code indicating to display image data that is identical to previously decoded image data can be generated.

Here, the threshold is a predictive code amount of the picture.

According to this construction, a predictive code amount of a picture of each of an I-picture, a P-picture, and a B-picture is set as the threshold for the picture. This ensures that an underflow of the receiver buffer is prevented.

Here, the threshold setting unit calculates a variance of pixel values of the image data, and sets a higher threshold for a higher calculated variance.

With this construction, the higher the variance of the pixels contained in the image data, the larger the code amount of the image data in general. Therefore, by setting a higher threshold for a higher variance, preventing an underflow of the receiver buffer is further ensured.

Here, the threshold setting unit sets a higher threshold for a higher activity ACT of an original image, the activity ACT being a sum of activities act of all macroblocks included in the original image, an activity act being expressed by the equation $act_j = 1 + VAR_j$ where $VAR_j$ is a minimum value among variances of pixel values of the original image in each of eight blocks that form a macroblock j, the eight blocks being composed of four blocks in a frame DCT mode and four blocks in a field DCT mode, and act is an activity of the macroblock j.

With this construction, the higher the activity of image data, the larger the code amount of the image data in general. Therefore, by setting a higher threshold for a higher activity of the image data, preventing an underflow of the receiver buffer is further ensured.

Here, the threshold setting unit sets a predictive code amount of each of an I-picture and a P-picture as the threshold for each of an I-picture and a P-picture, and sets a value larger than a predictive code amount of a B-picture as the threshold for a B-picture.

With this construction, the threshold for a B-picture is set as a value larger than the predictive code amount of a B-picture. This makes a B-picture more likely be skipped, and accordingly, it becomes less likely that an I-picture or a P-picture that is referred to by other pictures is skipped. This can prevent same images from being displayed consecutively.

Here, when M≧2, M representing an appearance cycle of an I-picture or a P-picture, the threshold setting unit sets: a threshold Ti of an I-picture as Ti=Ei; a threshold Tp of a P-picture as Tp=Ep; a threshold Tb(i) of a B-picture immediately preceding an I-picture in an encoding order as Tb(i)=Eb+(Ei−R) when (Ei−R)≧0, and Tb(i)=Eb when (Ei−R)<0; and a threshold Tb(p) of a B-picture immediately preceding a P-picture in the encoding order as Tb(p)=Eb+(Ep−R) when (Ep−R)≧0, and Tb(p)=Eb when (Ep−R)<0, where Ei is the predictive code amount of an I-picture, Ep is the predictive code amount of a P-picture, Eb is the predictive code amount of a B-picture, and R is a transmission bit amount during each decoding time interval.

With this construction, the threshold for a B-picture immediately preceding an I-picture or a P-picture in the encoding order is set based on a predictive code amount of an I-picture or a B-picture, to prevent an I-picture or a P-picture from being skipped.

Here, when M≧3, M representing an appearance cycle of an I-picture or a P-picture, the threshold setting unit sets: a threshold Ti of an I-picture as Ti=Ei; a threshold Tp of a P-picture as Tp=Ep; a threshold Tb2(i) of a B-picture B2(i) immediately preceding an I-picture in an encoding order as Tb2 (i)=Eb+(Ei−R) when (Ei−R)≧0, and Tb2(i)=Eb when (Ei−R)<0; a threshold Tb1(i) of a B-picture B1(i) immediately preceding a B-picture B2(i) in the encoding order as Tb1(i)=Eb+(Tb2(i)−R) when (Tb2(i)−R)≧0, and Tb1(i)=Eb when (Tb2(i)−R)<0; a threshold Tb2(p) of a B-picture B2(p) immediately preceding a P-picture in the encoding order as Tb2(p)=Eb+(Ep−R) when (Ep−R)≧0, and Tb2(p)=Eb when (Ep−R)<0; and a threshold Tb1(p) of a B-picture B1(p) immediately preceding a B-picture B2(p) in the encoding order as Tb1(p)=Eb+(Tb2(p)−R) when (Tb2(p)−R)≧0, and Tb1(p)=Eb when (Tb2(p)−R)<0, where Ei is the predictive code amount of an I-picture, Ep is the predictive code amount of a P-picture, Eb is the predictive code amount of a B-picture, and R is a transmission bit amount during each decoding time interval.

With this construction, the threshold for a B-picture immediately preceding an I-picture or a P-picture in the encoding order and for a B-picture immediately preceding the B-picture in the encoding order are set based on a predictive code amount of an I-picture or a B-picture, to prevent an I-picture or a P-picture from being skipped.

Here, when M≧3, M representing an appearance cycle of an I-picture or a P-picture, the threshold setting unit sets the threshold of a B-picture B2 immediately preceding an I-picture in an encoding order, higher than the threshold of a B-picture B1 immediately preceding the B-picture B2 in the encoding order.

With this construction, skipping a B-picture to avoid skipping an I-picture or a P-picture is likely to occur immediately before an I-picture or a P-picture. As a result, unnecessary skipping of a B-picture at a point where it is highly uncertain whether an I-picture or a P-picture needs to be skipped, that is to say, at a point where the prediction of the accumulation in the receiver buffer at the decoding time involves a number of predictions, can be avoided.

Here, when M≧3, M representing an appearance cycle of an I-picture or a P-picture, the threshold setting unit sets: a threshold Ti of an I-picture as Ti=Ei; a threshold Tp of a P-picture as Tp=Ep; a threshold Tb2(i) of a B-picture B2(i) immediately preceding an I-picture in an encoding order as Tb2(i)=Eb+(Ei−R) when (Ei−R)≧0, and Tb2(i)=Eb when (Ei−R)<0; a threshold Tb1(i) of a B-picture B1(i immediately preceding a B-picture B2(i) in the encoding order as Tb1(i)=Dbskip+(Tb2(i)−R) when Dbskip+(Tb2(i)−R)≧Eb, and Tb1(i)=Eb when Dbskip+(Tb2(i)−R))<Eb; a threshold Tb2(p) for a B-picture B2(p) immediately preceding a P-picture in the encoding order as Tb2(p)=Eb+(Ep−R) when (Ep−R)≧0, and Tb2(p)=Eb when (Ep−R)<0; and a threshold Tb1(p) of a B-picture B1(p) immediately preceding a B-picture B2(p) in the encoding order as Tb1(p)=Dbskip+(Tb2(p)−R) when Dbskip+(Tb2(p)−R)≧Eb, and Tb1(p)=Eb when Dbskip+(Tb2(p)−R)<Eb where Ei is the predictive code amount of an I-picture, Ep is the predictive code amount of a P-picture, Eb is the predictive code amount of a B-picture, R is a transmission bit amount during each decoding time interval, and Dbskip is a code amount of an all-skip B-picture.

With this construction, a B1-picture is skipped only when a B2-picture is skipped to avoid skipping an I-picture or a P-picture. Therefore, unnecessary skipping of a B1-picture at a point where it is highly uncertain whether an I-picture or a P-picture needs to be skipped, that is to say, at a point where the prediction of the accumulation in the receiver buffer at the decoding time the P-picture involves a number of predictions, can be avoided.

The above object can also be achieved by a video encoding apparatus that encodes a sequence of image data while predicting an accumulation amount of a receiver buffer in a decoding apparatus, each image data forming one frame or one field, the video encoding apparatus including: a threshold setting unit for setting, after encoding each image data, a threshold according to a picture type of the encoded image data in a case where M≧2, M representing an appearance cycle of an I-picture or a P-picture, as the following, a threshold Ti in a case where the image data is encoded to be an I-picture is set as Ti=Di, where Di is a predictive code amount of the I-picture, a threshold Tp in a case where the image data is encoded to be a P-picture is set as Tp=Dp, where Dp is a predictive code amount of the P-picture, a threshold Tb(i) in a case where the image data is encoded to be a B-picture immediately preceding an I-picture in an encoding order is set as Tb(i)=Dp+(Ei−R) when (Ei−R)≧0, and Tb(i)=Dp when (Ei−R)<0, where Db is a predictive code amount of the B-picture, Ei is a predictive code amount of the I-picture, and R is a transmission bit amount during each decoding time interval, and a threshold Tb(p) in a case where the image data is encoded to be a B-picture immediately preceding a P-picture in the encoding order is set as Tb(p)=Dp+(Ep−R) when (Ep−R)≧0, and Tb(p)=Dp when (Ep−R)<0, where Db is a predictive code amount of the B-picture, Ep is a predictive code amount of the P-picture, and R is a transmission bit amount during each decoding time interval; a comparing unit for comparing, after encoding the image data, a predictive accumulation amount with the threshold, the predictive accumulation amount being an amount of data predicted to be accumulated in the receiver buffer by the time when data obtained by encoding the image data is decoded; and a skipping unit for using a proxy code as data that is fetched from the receiver buffer at the decoding time, if the amount of data is below the threshold, the proxy code indicating to display image data that is identical to previously decoded image data.

With this construction, it becomes less likely that an I-picture or a P-picture is skipped. Also, a threshold is not set as a predictive code amount of a picture but as a value larger than an actual code amount of the picture. This ensures that an underflow of the receiver buffer is prevented.

The above object can further be achieved by a video encoding apparatus that encodes a sequence of image data in a frame structure, each image data forming one frame, including: a comparing unit for comparing, prior to encoding of each image data, one of (a) a predictive accumulation amount of a receiver buffer in a decoding apparatus and (b) an accumulation amount of an output buffer, with a predetermined standard value, the predictive accumulation amount being an amount of data predicted to be accumulated in the receiver buffer; a skipping unit for (a) canceling the encoding of the image data in the frame structure and (b) substituting a proxy code indicating to display two fields that each are identical to one of a top field and a bottom field of previously decoded image data, for data that is obtained by encoding a top field and a bottom field of the image data, if the amount of data is below the predetermined standard value.

Usually, when encoding of image data is skipped, the allocation of pictures is switched to the field structure, and so each field of skipped image data can refer to either a top field and a bottom field. According to the above construction, however, the frame structure is maintained even when the encoding of the image data is skipped, and therefore, a reversal in the display order of images can be prevented.

Here, the skipping unit uses the proxy code indicating to display the two fields that each are identical to the field that is the nearest, in a display order, to each of the top field and the bottom field of the image data which has been canceled to be encoded in the frame structure, the field being selected out of the top field and the bottom field of the previously decoded image data.

With this construction, each field in the image data for which encoding has been skipped uses a nearest field in the display order as a reference field. As a reference field of the top field in the image data for which encoding has been skipped is never displayed after a reference field of the bottom field in the skipped image data, the reversal in the display order of images can be surely prevented.

Here, when the image data which has been canceled to be encoded in the frame structure is encoded to be a B-picture, the skipping unit uses two all-skip B-pictures that each are a B-picture in which macroblocks in all slice layers except a first macroblock and a last macroblock in each slice layer are skipped macroblocks as the proxy code, and when the image data which has been canceled to be encoded in the frame structure is encoded to be an I-picture or a P-picture, the skipping unit uses two all-skip P-pictures that each are a P-picture in which macroblocks in all slice layers except a first macroblock and a last macroblock in each slice layer are skipped macroblocks as the proxy code.

With this construction, using skipped macroblocks of MPEG, a proxy code indicating to display image data that is identical to previously decoded image data can be generated.

Here, (a) each all-skip P-picture used by the skipping unit when the image data which has been canceled to be encoded in the frame structure is encoded to be an I-picture or a P-picture uses a bottom field of a previously displayed I-picture or P-picture as a reference field, (b) each all-skip B-picture used by the skipping unit when the image data which has been canceled to be encoded in the frame structure is encoded to be a B-picture B1 uses a top field of a previously displayed I-picture or P-picture as a reference field, and (c) each all-skip B-picture used by the skipping unit when the image data which has been canceled to be encoded in the frame structure is encoded to be a B-picture B2 uses a top field of a successively displayed I-picture or P-picture as a reference field.

With this construction, an all-skip picture that designates an appropriate reference field is selected depending on a picture type, and so the reversal in the display order can be avoided easily and appropriately.

Here, when the image data which has been canceled to be encoded in the frame structure is encoded to be an I-picture or a P-picture, the skipping unit cancels encoding of image data encoded to be a B-picture immediately following the I-picture or the P-picture in the display order, and substitutes two all-skip B-pictures that each use a bottom field of a previously displayed picture as a reference field, for data obtained by encoding the top field and the bottom field of the image data.

With this construction, when skipping a P-picture or an I-picture occurs, each field in image data of a B-picture that refers to the P-picture or the I-picture refers to same fields that are referred to by the fields in the skipped image data. Accordingly, the reversal in the display order can be prevented.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 2A shows examples of images displayed in a normal case;

FIG. 2B shows examples of images displayed in a case where a skipped macroblock is used;

FIG. 2C shows examples of images displayed in a case where a pseudo image is used;

FIG. 8 shows examples of thresholds set in the first embodiment;

FIG. 9A shows the predictive accumulation amount of the receiver buffer when an I-picture is skipped in the first embodiment;

FIG. 9B shows the predictive accumulation amount of the receiver buffer when a B1-picture is skipped in the first embodiment;

FIG. 9C shows the predictive accumulation amount of the receiver buffer when a B2-picture is skipped in the first embodiment;

FIG. 9D shows the predictive accumulation amount of the receiver buffer when a P-picture is skipped in the first embodiment;

FIG. 12 shows examples of thresholds set in a second embodiment of the present invention;

FIG. 15A shows examples of images displayed by a decoding apparatus in a normal case in the second embodiment;

FIG. 15B shows examples of images displayed by the decoding apparatus when a picture is judged to be skipped based on the thresholds employed in the first embodiment;

FIG. 15C shows examples of images displayed by the decoding apparatus when a picture is judged to be skipped based on the thresholds employed in the second embodiment;

FIG. 16 shows examples of thresholds set in a modification of the second embodiment;

FIG. 18 shows a picture header and a picture coding extension in a picture layer of an all-skip B-picture in a third embodiment of the present invention;

DESCRIPTION OF THE PREFERRED EMBODIMENTS

The following is an explanation of preferred embodiments of the present invention, with reference to the drawings.

<First Embodiment>

The present embodiment relates to a video encoding apparatus that judges, prior to generation of a picture, whether to skip the picture or not, by comparing a predictive code amount obtained based on an empirical value of a picture type of the picture and the predictive accumulation amount of the receiver buffer.

(Construction of Video Encoding Apparatus)

Figure 1A:
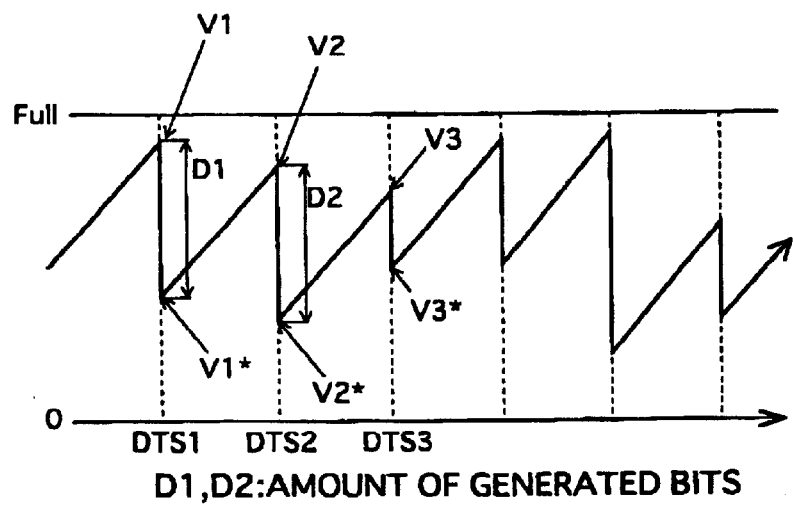
FIG. 1A shows changes of the predictive accumulation amount of a receiver buffer.
Figure 1B:
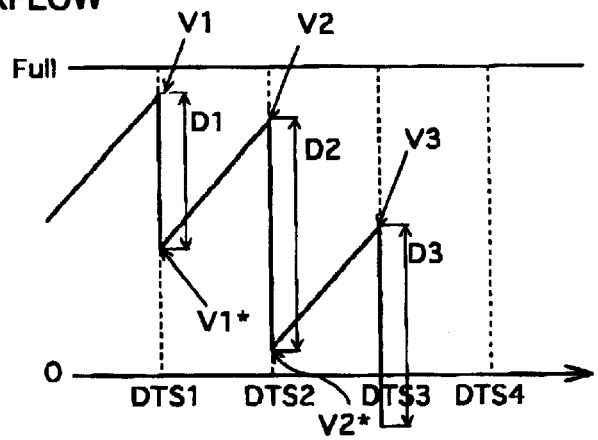
FIG. 1B shows an example of an underflow of the predictive accumulation amount of the receiver buffer.
Figure 1C:
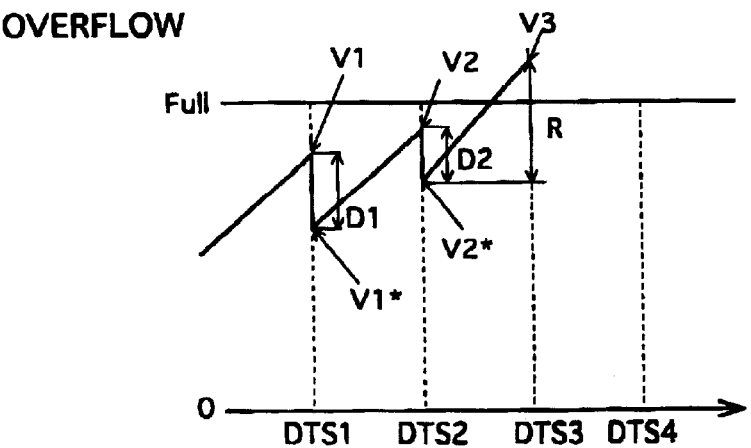
FIG. 1C shows an example of an overflow of the predictive accumulation amount of the receiver buffer.
Figure 3:
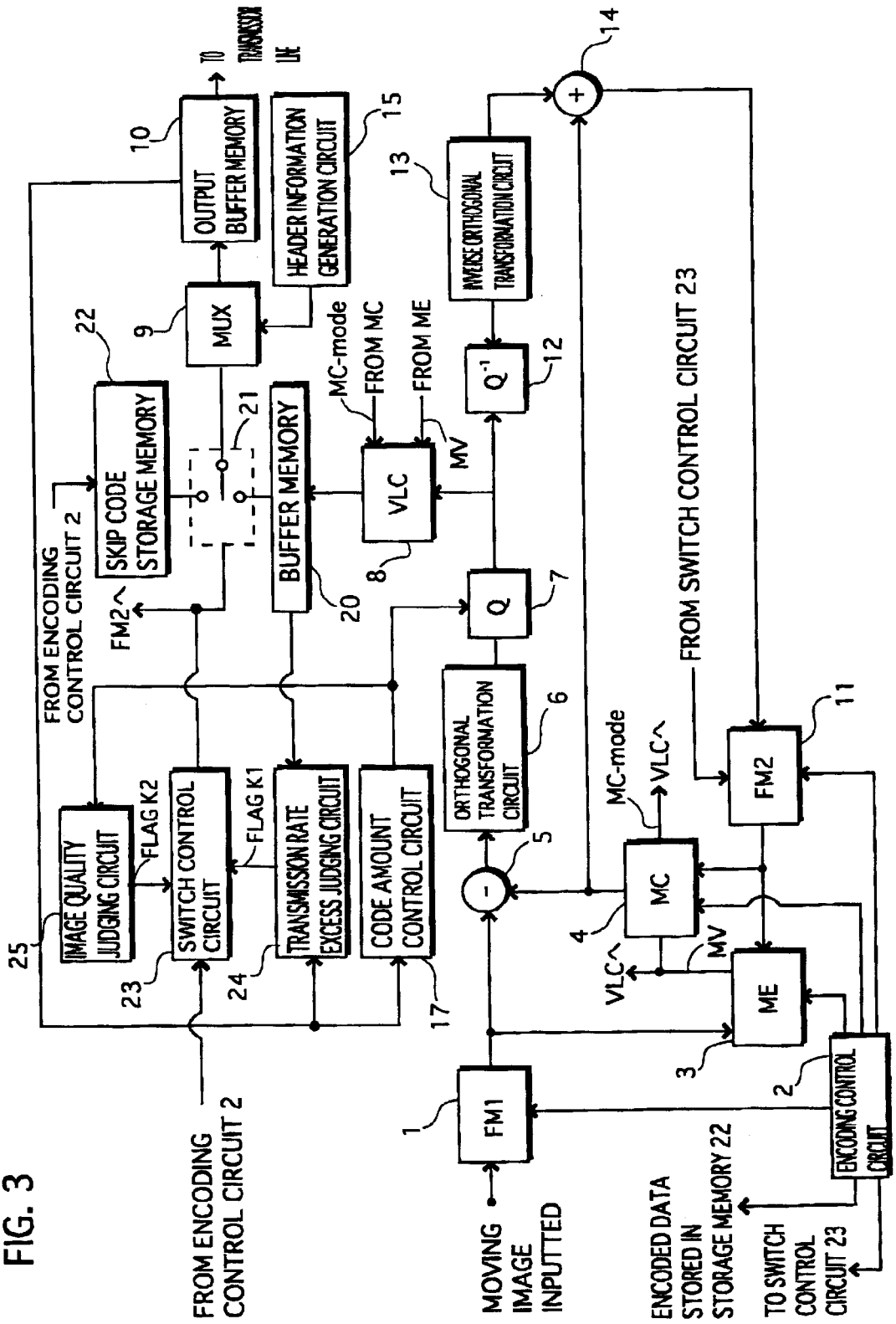
FIG. 3 shows a construction of a video encoding apparatus disclosed in Japanese Patent No. 2871316.
Figure 4A:
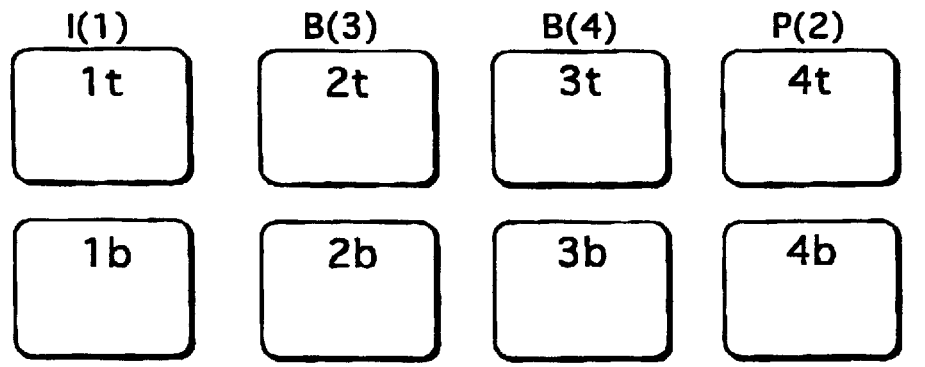
FIG. 4A shows images displayed in a normal case where no picture is skipped.
Figure 4B:
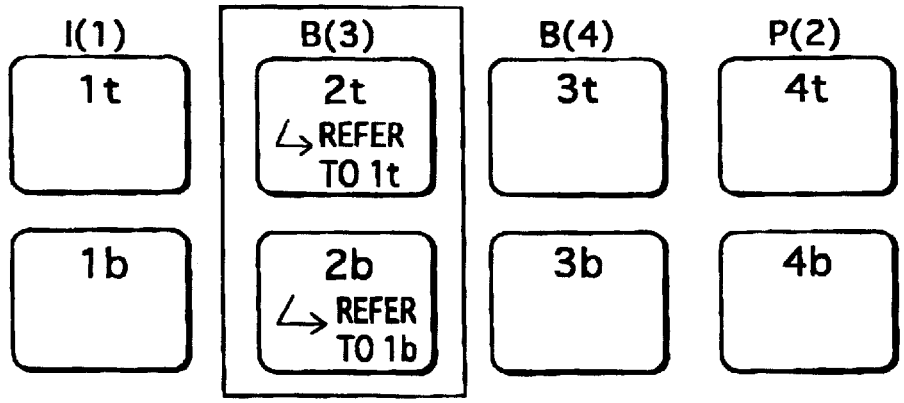
FIG. 4B shows images displayed in a case where a picture is skipped.
Figure 5:
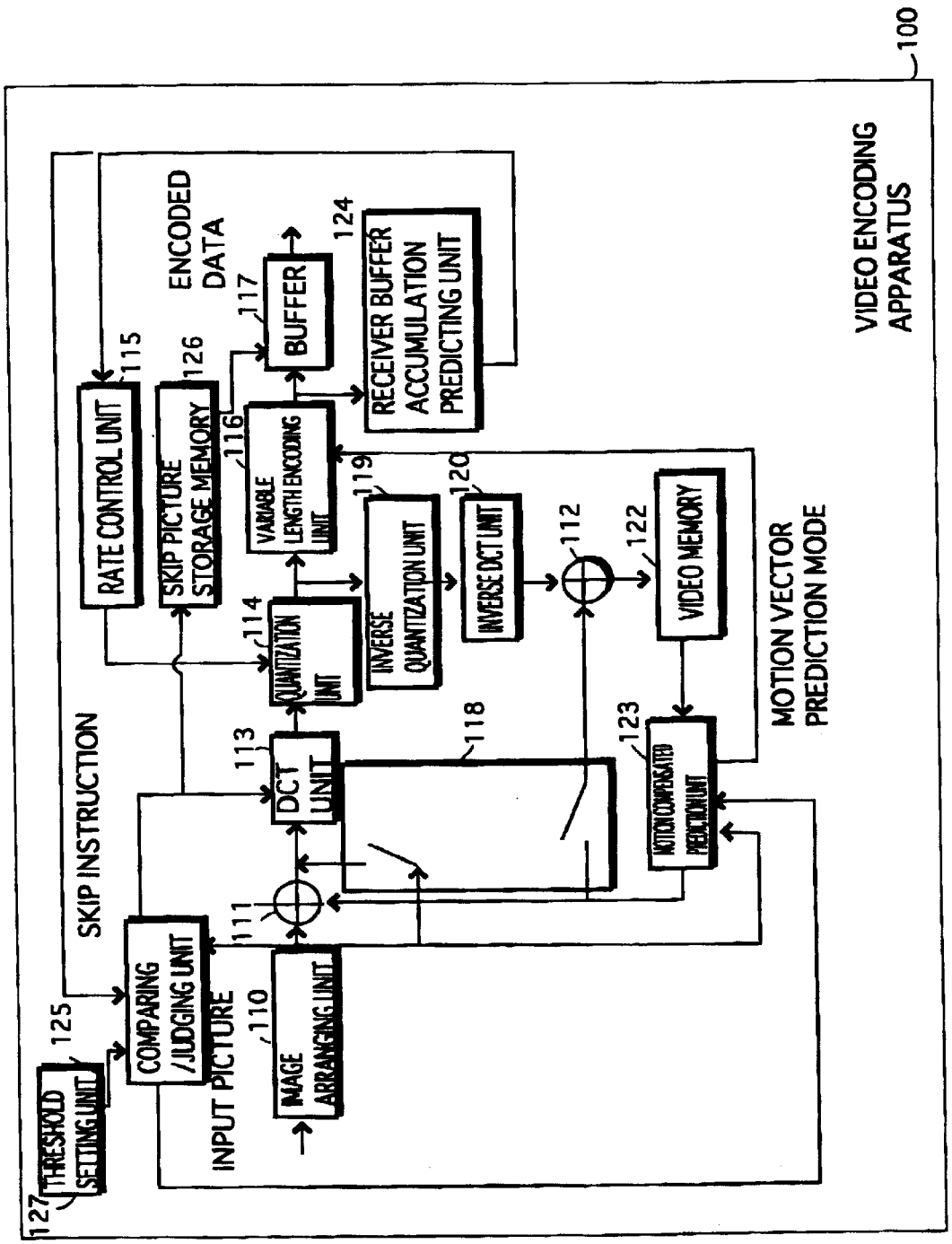
FIG. 5 shows a construction of a video encoding apparatus relating to a first embodiment of the present invention.

FIG. 5 shows the construction of a video encoding apparatus 100 to which the present invention relates. The video encoding apparatus 100 is roughly composed of an image arranging unit 110, a DCT unit 113, a quantization unit 114, a rate control unit 115, a variable length encoding unit 116, a buffer 117, an inverse quantization unit 119, an inverse DCT unit 120, a video memory 122, a motion compensated prediction unit 123, adders 111 and 112, a switch 118, a receiver buffer accumulation predicting unit 124, a comparing/judging unit 125, a SKIP picture storage memory 126, and a threshold setting unit 127.

Figure 6A:
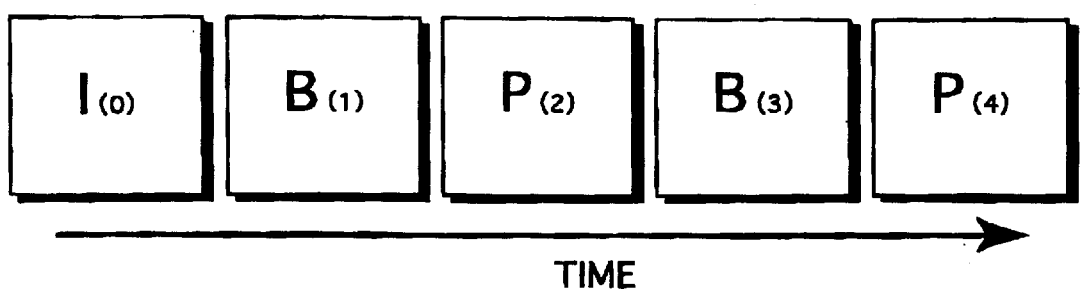
FIG. 6A shows the original order of video images in the first embodiment.
Figure 6B:
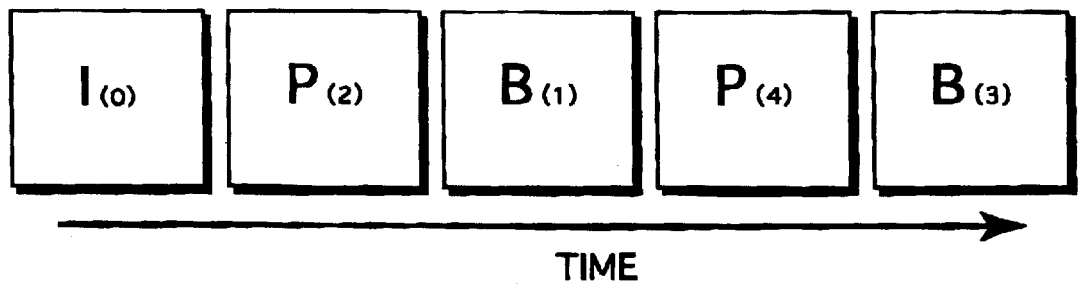
FIG. 6B shows the order of video images to be encoded in the first embodiment.

The image arranging unit 110 arranges images in the encoding order according to picture types. FIG. 6A shows the original order of video images, that is to say, the order of the video images to be displayed by a decoding apparatus. FIG. 6B shows the order of video images to be encoded, that is to say, the order of the video pictures to be inputted into the decoding apparatus. As a B-picture is coded with reference to a nearest previous/following I-picture or P-picture, the B-picture is coded after a future P-picture.

The DCT unit 113 performs Discrete Cosine Transform (DCT) calculation on a macroblock basis, so as to output DCT coefficients for each macroblock. Here, the DCT calculation is performed in an intra coding mode for an Intra coded picture (I-picture), and the DCT calculation is performed in either the intra coding mode or a motion compensated prediction mode, the mode being selected for each macroblock, for a Predictive coded picture (P-picture) and a Bidirectionally predictive coded picture (B-picture). In the intra coding mode, the DCT calculation is performed on an input original image, whereas in the motion compensated prediction mode, the DCT calculation is performed on the difference between the input original image and a predictive image obtained by the motion compensated prediction unit 123.

The quantization unit 114 quantizes the DCT coefficients for each macroblock using a quantization scale suitable for each macroblock.

The variable length encoding unit 116 performs variable length encoding on the quantized DCT coefficients as well as a motion vector and coding prediction mode information, to generate encoded data of the image data.

The buffer 117 stores the encoded data of the image data or an all-skip picture.

As an original image of an I-picture or a P-picture needs to be used as a reference image in motion compensated prediction, the inverse quantization unit 119 and the inverse DCT unit 120 subject the quantized DCT coefficients of the I-picture or the P-picture to the processing which is reverse to the processing done by the quantization unit 114 and the DCT unit 113 to restore the original image, and outputs the restored original image to the video memory 122.

The video memory 122 stores the original image of the I-picture or the P-picture as a reference image.

The motion compensated prediction unit 123 forms a predictive image based on the reference image stored in the video memory 122 using the motion vector and, outputs the predictive image for coding of a P-picture or a B-picture.

The rate control unit 15 instructs the quantization unit 114 to change a quantization scale according to the predictive accumulation amount of the receiver buffer. More specifically, the rate control unit 115 instructs the quantization unit 114 to increase the quantization scale when the predictive accumulation amount of the receiver buffer exceeds a predetermined amount, and to decrease the quantization scale when the predictive accumulation amount of the receiver buffer is below the predetermine amount.

The SKIP picture storage memory 126 stores all-skip pictures for a P-picture and a B-picture. It should be noted here that an all-skip picture is a picture in which all macroblocks except a first and a last macroblocks in each slice layer are skipped macroblocks. Instead of a B-picture and a P-picture, a B-picture and a P-picture in which all macroblocks except a first and a last macroblocks in each slice layer are skipped macroblocks are outputted, and these are respectively referred to as an all-skip B-picture and an all-skip P-picture. As an I-picture cannot be skipped (whose macroblocks cannot be replaced with skipped macroblocks), an all-skip P-picture is outputted instead of an I-picture. These all-skip pictures are outputted instead of encoded data of image data, that is to say, they are "proxy codes" for the encoded data of the image data.

The receiver buffer accumulation predicting unit 124 calculates, every time one picture is outputted, the predictive accumulation amount of the receiver buffer at the time of decoding a next picture prior to decoding.

Figure 7A:
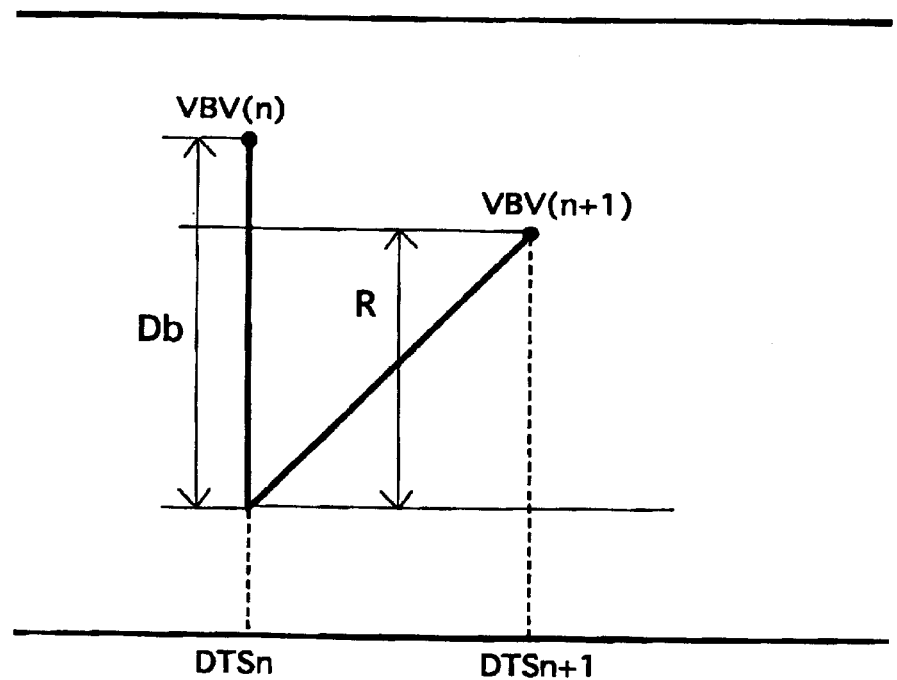
FIG. 7A shows the predictive accumulation amount of a receiver buffer in a normal case where no picture is skipped in the first embodiment.

FIG. 7A shows the predictive accumulation amount of the receiver buffer in a normal case where no picture is skipped. Assuming the predictive accumulation amount of the receiver buffer at DTSn prior to decoding as VBV(n), the generation bit amount of a B-picture decoded at DTSn as Db, and the transmission bit amount during each DTS time interval as R, an equation "VBV(n+1)=VBV(n)−Db+R" is obtained.

Figure 7B:
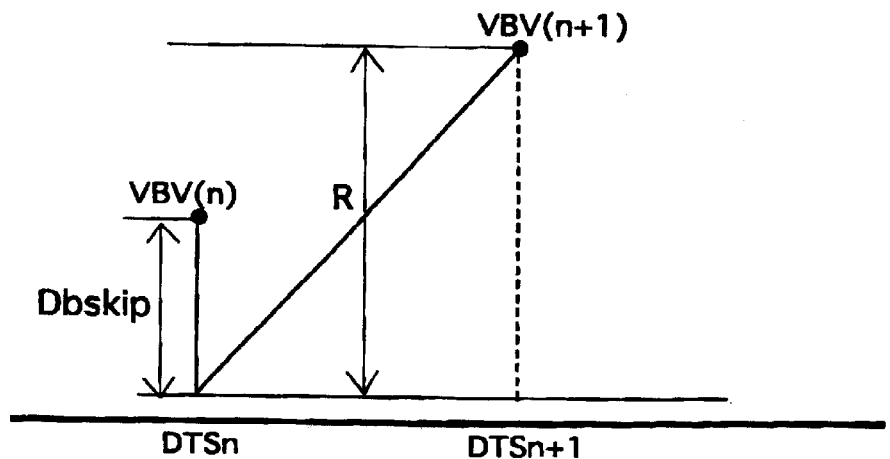
FIG. 7B shows the predictive accumulation amount of the receiver buffer in a case where a picture is skipped in the first embodiment.

FIG. 7B shows the predictive accumulation amount of the receiver buffer when a B-picture is skipped. Assuming the predictive accumulation amount of the receiver buffer at DTSn prior to decoding as VBV(n), the generation bit amount of an all-skip B-picture to be decoded at DTSn as Dbskip, the transmission bit amount during each DTS time interval as R, an equation "VBV(n+1)=VBV(n)−Dbskip+R" is obtained.

The threshold setting unit 127 sets thresholds Ti, Tp, Tb1, and Tb2 respectively for picture types "I", "P", "B1", and "B2".

Figure 8:
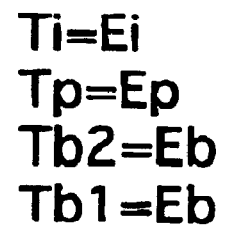

FIG. 8 shows examples of thresholds respectively set for picture types. Code amounts Ei, Ep, and Eb for respective picture types known by empirical values (hereafter referred to as "predictive code amounts") are set as the thresholds Ti, Tp, Tb1, and Tb2.

$$Ti=Ei$$

$$Tp=Ep$$

$$Tb1=Eb$$

$$Tb2=Eb$$

Note in the present embodiment, values "Ei=400 kbit", "Ep=200 kbit", "Eb=160 kbit" that have been empirically known to be optimum values for image data with resolution of 720×480 pixels are used. Also, as resolution of image data and a predictive code amount are proportional to each other, when resolution is different from the above, the predictive code amount can be calculated relative to the resolution of the image data.

The comparing/judging unit 125 compares, prior to encoding of each image data, the predictive accumulation amount of the receiver buffer VBV with its threshold, and judges whether the encoding process of the image data is to be skipped or not. More specifically, in a case where the image data is encoded to be an I-picture, the comparing/judging unit 125 judges that the encoding process of the image data is to be skipped when "VBV<Ti". In a case where the image data is encoded to be a P-picture, the comparing/judging unit 125 judges that the encoding process of the image data is to be skipped when "VBV<Tp". In a case where the image data is encoded to be a B1-picture, the comparing/judging unit 125 judges that the encoding process of the image data is to be skipped when "VBV<Tb1". In a case where the image data is encoded to be a B2-picture, the comparing/judging unit 125 judges that the encoding process of the image data is to be skipped when "VBV<Tb2".

FIGS. 9A, 9B, 9C, and 9D each show a case where a picture is skipped.

In FIG. 9A, since "VBV<Ti", an I-picture is skipped at DTSn.

In FIG. 9B, since "VBV<Tb1", a B1-picture is skipped at DTSn+1.

In FIG. 9C, since "VBV<Tb2", a B2-picture is skipped at DTSn+2.

In FIG. 9D, since "VBV<Tp", a P-picture is skipped at DTSn+3.

When the comparing/judging unit 125 judges that a picture is to be skipped, the comparing/judging unit 125 has the DCT unit 113 cancel the encoding process, and output an all-skip picture suitable for a picture type of the picture from the SKIP picture storage memory 126.

Figure 10A:
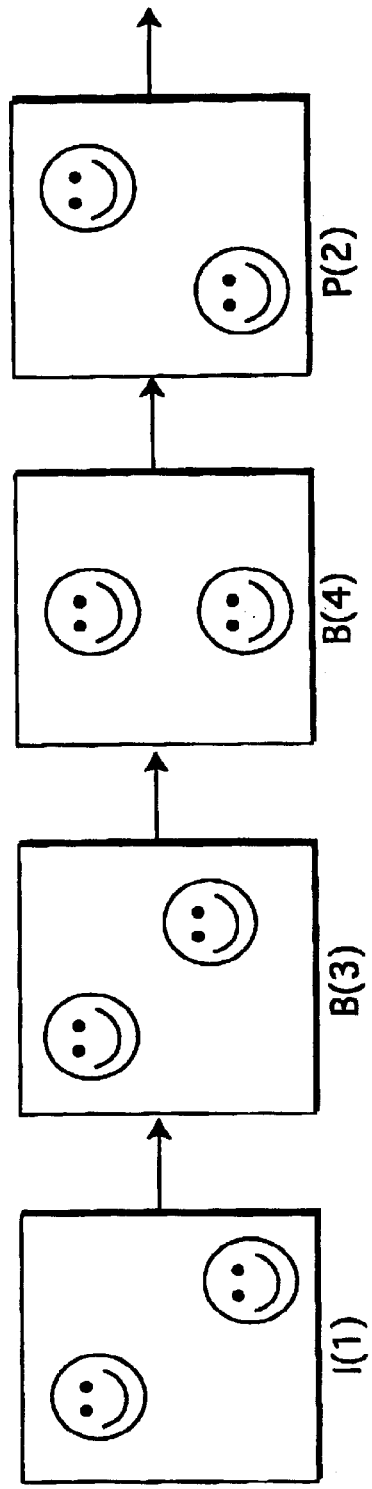
FIG. 10A shows examples of images displayed by a decoding apparatus in a normal case in the first embodiment.

FIG. 10A shows examples of images displayed by the decoding apparatus in a normal case. In the figure, a first frame, a second frame, a third frame, and a fourth frame respectively show original images of an I-picture(1), a B-picture(3), a B-picture(4), and a P-picture(2). Reference numerals in parentheses indicate the order in which the images are encoded.

Figure 10B:
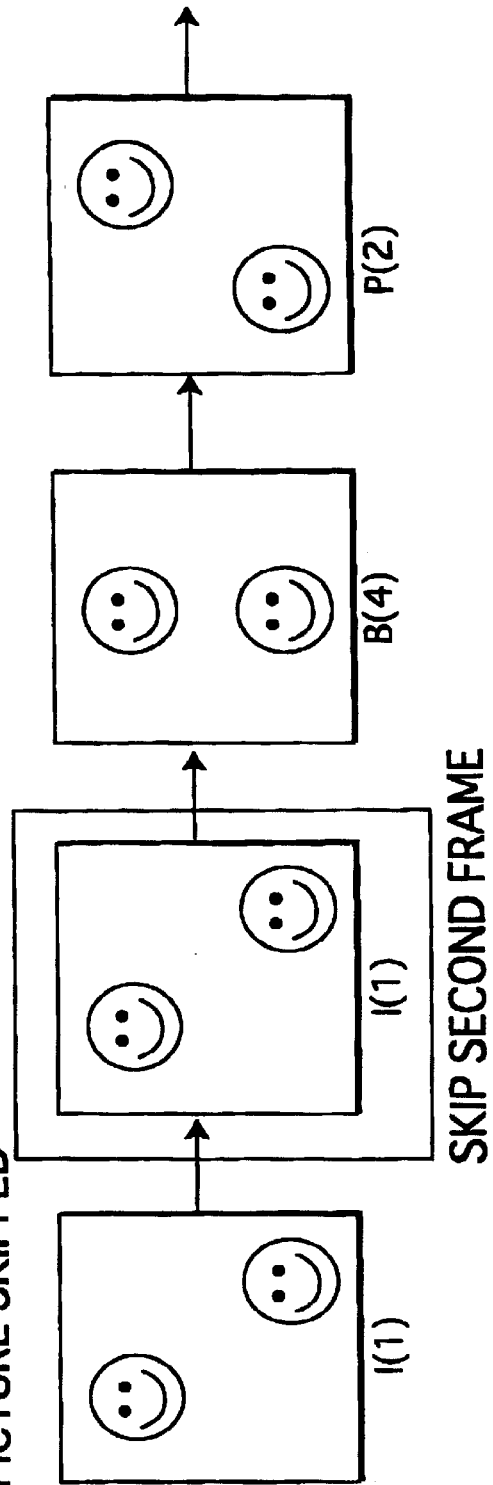
FIG. 10B shows examples of images displayed by the decoding apparatus when a picture is skipped in the first embodiment.

FIG. 10B shows examples of images displayed by the decoding apparatus when a picture is skipped. The B-picture (3) of the second frame in FIG. 10A refers to the original images of the I-picture(1) and the P-picture(2), and when the B-picture(3) is skipped, the second frame in FIG. 10B displays the original image of the I-picture(1) as it is nearer to the B-picture(3) in terms of the encoding order.

(Operation)

The following is an explanation of an operation relating to a skip process performed by the video encoding apparatus in the present embodiment.

Figure 11:
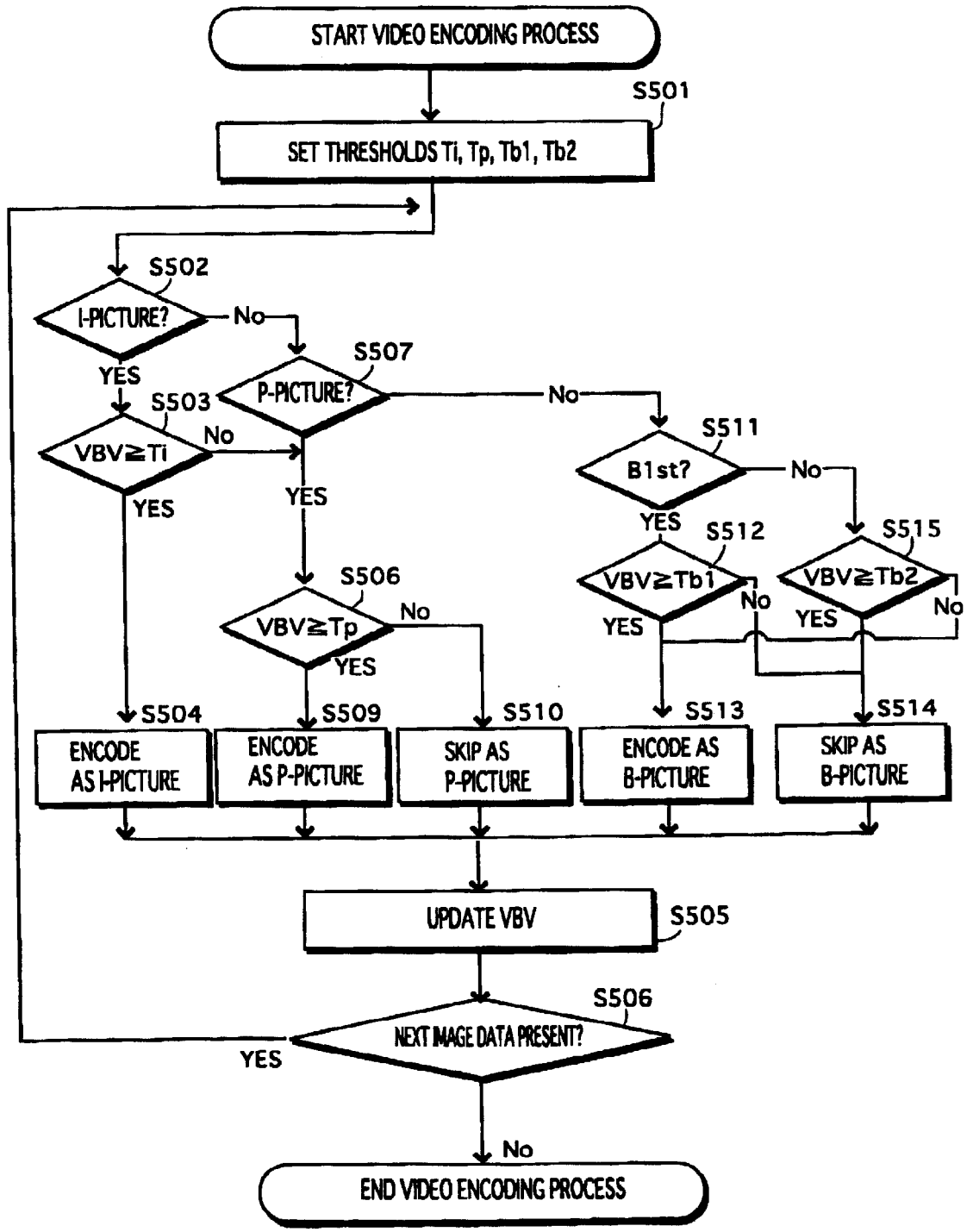
FIG. 11 is a flowchart showing operation procedures of the video encoding apparatus relating to the first embodiment.

FIG. 11 is a flowchart showing operation procedures performed by the video encoding apparatus.

First, the threshold setting unit 127 sets thresholds Ti, Tp, Tb1, and Tb2 for respective picture types, for the judgment whether each picture is to be skipped or not (step S501).

When an original image is encoded to be an I-picture, the comparing/judging unit 125 compares the predictive accumulation amount of the receiver buffer VBV and the threshold Ti. When "VBV≧Ti", the DCT unit 113, the quantization unit 114, and the variable length encoding unit 116 perform the encoding process of an I-picture on the original image (steps S502, S503, S504).

The receiver buffer accumulation predicting unit 124 calculates, based on the generation bit amount of the I-picture and the transmission bit amount during each DTS time interval R, the predictive accumulation amount of the receiver buffer VBV prior to decoding at the next DTS (step S505).

When there is next image data, the processing moves on to the next image data, or when there is no image data left, the processing ends (step S506).

Alternatively, when the comparing/judging unit 125 judges that "VBV<Ti" in step S503, the comparing/judging unit 125 compares the predictive accumulation amount of the receiver buffer VBV and the threshold Tp. When "VBV≧Tp", the encoding process of a P-picture is performed on the original image, or when "VBV<Tp", an all-skip P-picture is outputted from the SKIP picture storage memory 126. Following this, the receiver buffer accumulation predicting unit 124 calculates, based on the generation bit amount of the all-skip P-picture and the transmission bit amount during each DTS time interval R, the predictive accumulation amount of the receiver buffer VBV at the next DTS (steps S508, S509, S510, S505)

When the original image is encoded to be a P-picture, the comparing/judging unit 125 compares the predictive accumulation amount of the receiver buffer VBV and the threshold Tp. When "VBV≧Tp", the DCT unit 113, the quantization unit 114, and the variable length encoding unit 116 perform the encoding process of a P-picture on the original image in the normal way. When "VBV<Tp", an all-skip P-picture is outputted from the SKIP picture storage memory 126. Following this, the receiver buffer accumulation predicting unit 124 calculates, based on (a) one of the generation bit amount of the P-picture and the generation bit amount of the all-skip P-picture, and (b) the transmission bit amount during each DTS time interval R, the predictive accumulation amount of the receiver buffer VBV prior to decoding at the next DTS (steps S507, S508, S509, S510, S505).

When the original image is encoded to be a B1-picture, the comparing/judging unit 125 compares the predictive accumulation amount of the receiver buffer VBV and the threshold Tb1. When "VBV≧Tb1", the DCT unit 113, the quantization unit 114, and the variable length encoding unit 116 perform the encoding process of a B-picture on the original image in the normal way. When "VBV<Tb1", an all-skip B-picture is outputted from the SKIP picture storage memory 126. Following this, the receiver buffer accumulation predicting unit 124 calculates, based on (a) one of the generation bit amount of the B-picture and the generation bit amount of the all-skip B-picture, and (b) the transmission bit amount during each DTS time interval R, the predictive accumulation amount of the receiver buffer VBV prior to decoding at the next DTS (steps S511, S512, S513, S514, S505).

When the original image is encoded to be a B2-picture, the comparing/judging unit 125 compares the predictive accumulation amount of the receiver buffer VBV and the threshold Tb2. When "VBV≧Tb1", the DCT unit 113, the quantization unit 114, and the variable length encoding unit 116 perform the encoding process of a B-picture on the original image in the normal way. When "VBV<Tb2", an all-skip B-picture is outputted from the SKIP picture storage memory 126. Following this, the receiver buffer accumulation predicting unit 124 calculates, based on (a) one of the generation bit amount of the B-picture and the generation bit amount of the all-skip B-picture, and (b) the transmission bit amount during each DTS time interval R, the predictive accumulation amount of the receiver buffer VBV prior to decoding at the next DTS (steps S511, S515, S513, S514, S505).

(Conclusion)

As described above, the video encoding apparatus relating to the present embodiment judges whether a picture is to be skipped by judging whether a predictive code amount obtained based on an empirical value for each picture type exceeds the predictive accumulation amount of the receiver buffer, prior to generation of the picture, instead of performing the above judgment by judging whether the generation bit amount of the picture exceeds the predictive accumulation amount of the receiver buffer after generating the picture. This dispenses with a special buffer for temporarily storing a generated picture for the judgment whether the picture is to be skipped or not.

Although the present invention has been described based on the first embodiment, the invention should not be limited to such; For instance, the following modifications are possible.

(Modification 1)

In the present embodiment, a fixed value is used as a threshold, however, a threshold may be determined according to complexity of each original image.

Assuming pixel values of an original image in an 8×8 pixel block as "$P_k(k=1\sim64)$" and the average values within the pixel block as "$E(P_k)$", the following equation is obtained.

$$E(P_k) = \tfrac{1}{64} \times \Sigma P_k$$

Also, assuming a variance within the pixel block as "$V(P_k)$", the following equation is obtained.

$$V(P_k) = \tfrac{1}{64} \times \Sigma (P_k - E(P_k))^2$$

Assuming a minimum value of the variances "$V(P_k)$" of 8 blocks contained in a macroblock "j" (4 blocks in a frame DCT mode and 4 blocks in a field DCT mode) as "$VAR_j$", the following equation is obtained.

$$VAR_j = \text{MIN}\,[V(P_k)]$$

Assuming an activity of the macroblock "j" as "$act_j$", the following equation is obtained.

$$act_j = 1 + VAR_j$$

Assuming an activity of an original image "ACT" as a sum of activities of all macroblocks in the original image, the following equation is obtained.

$$ACT = \Sigma act_j$$

The activity reflects the variance of the pixel values of the original image. Therefore, the higher the activity, the higher the complexity in each frame of the original image, and so the generation bit amount of the picture increases more. Accordingly, the higher the activity, the higher the threshold is to be set.

Also, the threshold may be set with reference to the variance. As one example, assuming "VAR=$\Sigma$VAR$_j$", the larger a value of "VAR", the higher the threshold may be set, and the smaller the value of "VAR", the lower the threshold may be set.

Also, instead of the variance of pixels contained in each block, the variance of pixels contained in a whole image may be used. More specifically, assuming the number of pixels contained in the whole image as "N", and the pixel values of the original image as "$P_1(1\sim N)$", the equation "$E=1/N\times\Sigma P_1$" is obtained, and so the variance "V" of the whole image is obtained using the following equation.

$$V=1/N\times\Sigma(P_1-E(P_1))^2$$

This means as follows. The larger a value of "V", the higher the threshold may be set, and the smaller the value of "V", the lower the threshold may be set.

(Modification 2)

In the present embodiment, when a predictive code amount of a picture of each type exceeds the predictive accumulation amount of the receiver buffer, the picture is skipped regardless of the picture type. However, as original images of an I-picture and a P-picture are used as reference images for other images, skipping an I-picture and a P-picture have an influence on the other pictures, which will be described later. Accordingly, either of the following methods may be employed: (a) skip only pictures of certain types; and (b) perform encoding while controlling the amount of codes by increasing a quantization scale, using only DC elements after DCT has been performed, or encoding pseudo image data.

As one example, when the predictive code amount of a picture exceeds the predictive accumulation amount of the receiver buffer, the picture may be skipped only when it is a B-picture. When the picture is either an I-picture or a P-picture, the encoding that controls the amount of codes may be performed. Alternatively, the picture may be skipped only when it is a B-picture or a P-picture, and when the picture is an I-picture, the encoding that controls the amount of codes may be performed.

(Modification 3)

In the present embodiment, an underflow of the receiver buffer can be prevented in most cases. However, to ensure that the receiver buffer will never underflow, the following method may be employed. In a case where the predictive code amount for a picture is below the predictive accumulation amount of the receiver buffer, the code amount of each macroblock contained in the picture may be compared with the predictive accumulation amount of the receiver buffer, after encoding the picture on a macroblock basis which is described above, and when the receiver buffer is found to underflow, the macroblock may be replaced with a skipped macroblock.

<Second Embodiment>

The present embodiment relates to a video encoding apparatus in which a B-picture is more likely to be skipped than a P-picture and an I-picture.

(Construction)

The video encoding apparatus in the second embodiment has the same construction as in the first embodiment with the only difference being in the way of setting thresholds by the threshold setting unit 127. The following explains the way the threshold setting unit 127 sets the thresholds.

The threshold setting unit 127 sets thresholds Ti, Tp, Tb1, Tb2 respectively for picture types "I", "P", "B1", and "B2".

FIG. 12 shows examples of thresholds set respectively for the picture types. Thresholds Ti and Tp are set equal to the predictive code amounts Ei and Ep as in the first embodiment as the following equations.

$Ti=Ei$ $Tp=Ep$

When an I-picture or a P-picture is skipped, a B-picture that refers to the skipped picture displays the same image as the skipped picture. In this case, for example, when M=3 (M denotes an appearance cycle of an I-picture or a P-picture), four consecutive frames display the same image. Accordingly, to maximize chances of skipping a B-picture immediately preceding a P-picture, a threshold for the B-picture is set higher than that in the first embodiment.

Figure 13:
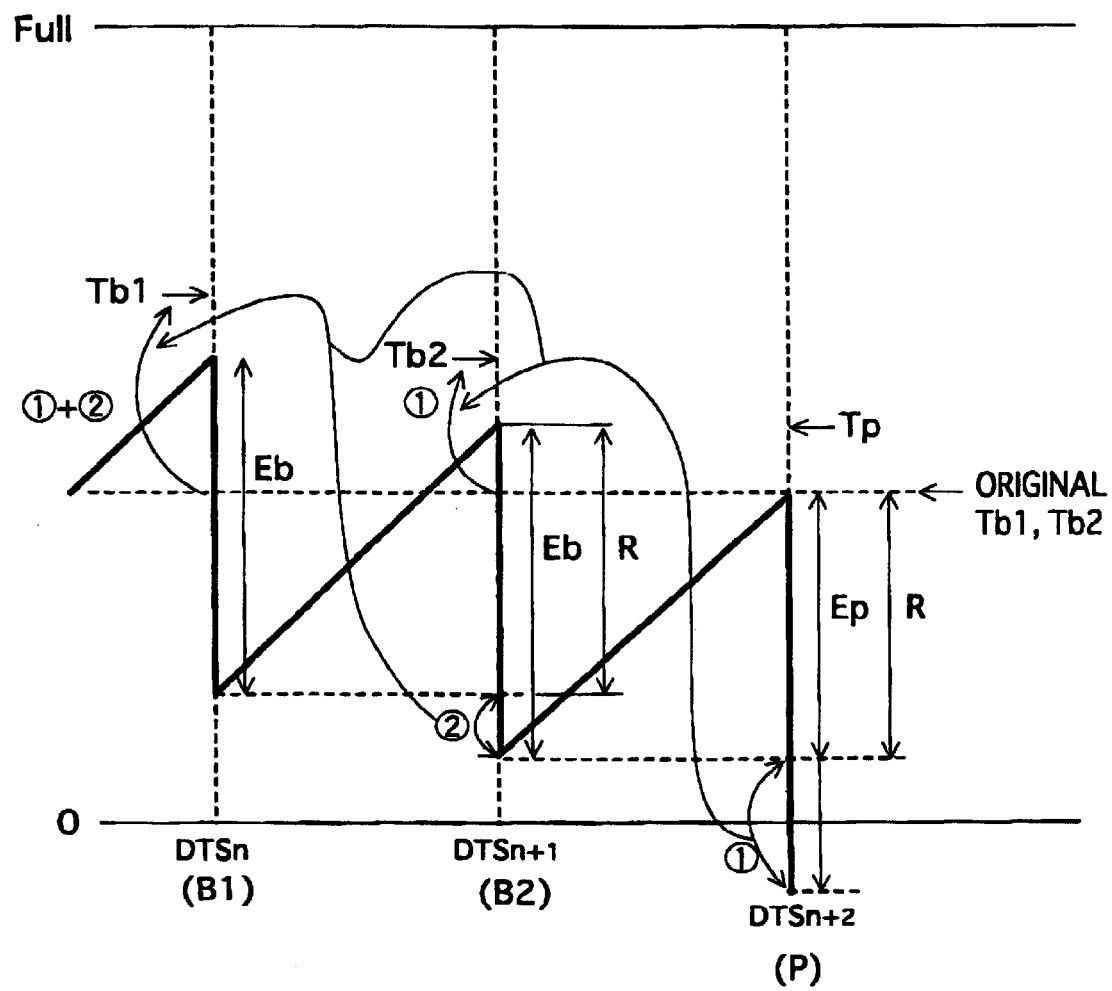
FIG. 13 is a diagram for explaining a threshold for a B-picture immediately preceding a P-picture in the second embodiment.

FIG. 13 is a diagram for explaining a threshold for a B-picture immediately preceding a P-picture.

Assuming the predictive accumulation amount of the receiver buffer VBV at DTSn+1 as VBV(n+1), the equation "VBV(n+2)=VBV(n+1)−Eb+R" is obtained at DTSn+2. If "VBV(n+2)≧Tp", it is predicted that a P-picture is not skipped at DTSn+2. The expressions are transformed into an expression "VBV(n+2)=VBV(n+1)−Eb+R≧Tp=Ep", so that it is found that the expression "VBV(n+1)≧Eb+(Ep−R)" needs to be satisfied.

Also, the expression "VBV(n+1)≧Eb" needs to be satisfied as in the first embodiment, and accordingly the expression "VBV(n+1)≧MAX(Eb, Eb+(Ep−R))" needs to be satisfied.

Accordingly, the threshold Tb2 is set as "Tb2=MAX(Eb, Eb+(Ep−R))", and when the predictive accumulation amount of the receiver buffer VBV is below the threshold Tb2 at DTSn+1, a B2-picture is to be skipped, so that the P-picture is not skipped in prediction.

This means as follows. When "(Ep−R)≧0,", a value "(Ep−R)" (a value equivalent to ① in FIG. 13) is added to an original threshold Tb2 so as to obtain a new threshold Tb2. When "(Ep−R)<0", the original threshold Tb2 is used.

In the same way, assuming the predictive accumulation amount of the receiver buffer VBV at DTSn as VBV(n), and so an expression "VBV(n+2)=VBV(n)−Eb+E−Eb+R=VBV(n)−Eb−(Eb−2R)" is obtained at DTSn+2. When "VBV(n+2)≧Tp", it is predicted that a P-picture is not skipped at DTSn+2. The expressions are transformed into an expression "VBV(n+2)=VBV(n)−Eb−(Eb−2R) ≧Tp=Ep". As a result, an expression "VBV(n)≧Eb+(Ep+Eb−2R)=Eb+(Ep−R)+(Eb−R)=Eb+(Tb2−R)" needs to be satisfied.

Also, as in the first embodiment, the expression "VBV(n)≧Eb" needs to be satisfied, and accordingly the expression "VBV(n)≧MAX(Eb, Eb+(Tb2−R))" needs to be satisfied.

Accordingly, the threshold Tb1 is set as "Tb1=MAX(Eb, Eb+(Tb2−R))", and when the predictive accumulation amount of the receiver buffer VBV is below the threshold Tb1 at DTSn, a B1-picture is skipped, so that the P-picture is not skipped in prediction.

This means as follows. When "(Tb2−R)≧0", a value "(Ep−R)" (a value equivalent to ① in FIG. 13) is added to an original threshold Tb1 so as to obtain a new threshold Tb1. When "(Tb2−R)<0", the original threshold Tb1 is used.

A threshold for a B-picture immediately preceding an I-picture can be set in the same manner as described above except that Ei is used instead of Ep. For differentiating an I-picture and a P-picture, a threshold for a B1-picture immediately preceding a P-picture is referred to as "Tb2(p)", a threshold for a B2-picture immediately preceding a P-picture is referred to as "Tb1(p), a threshold for a B2-picture immediately preceding an I-picture is referred to as "Tb2(i)", a threshold for a B2-picture immediately preceding an I-picture is referred to as "Tb1(i)", and so the following equations are obtained.

$$Tb2(p)=MAX(Eb, Eb+(Ep-R))$$

$$Tb1(p)=MAX(Eb, Eb+(Tb2(p)-R))$$

$$Tb2(i)=MAX(Eb, Eb+(Ei-R))$$

$$Tb1(i)=MAX(Eb, Eb+(Tb2(i)-R))$$

Figure 14A:
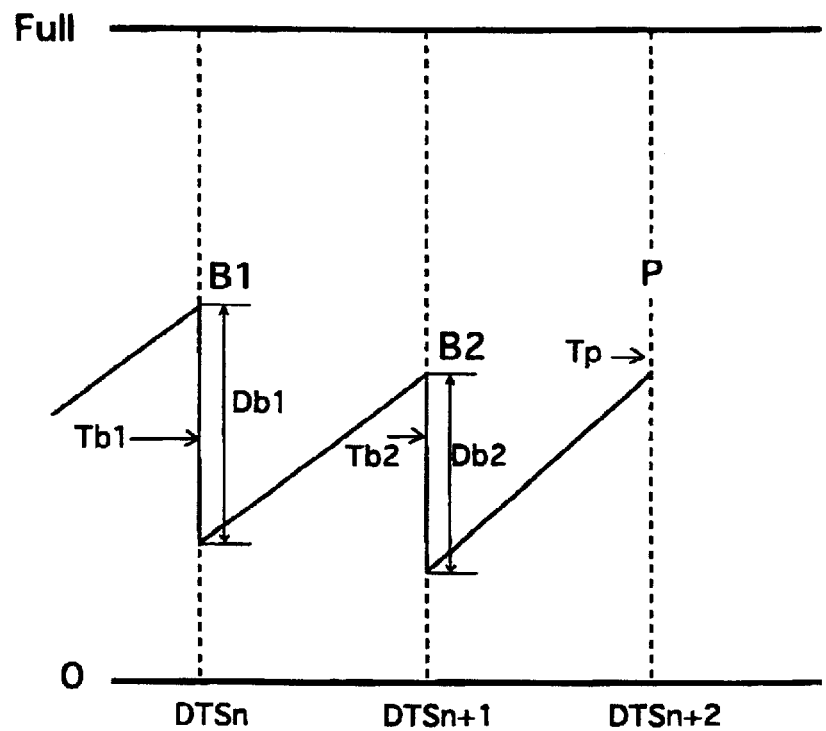
FIG. 14A shows the predictive accumulation amount of the receiver buffer for which the thresholds in the first embodiment are employed.

FIG. 14A shows changes of the predictive accumulation amount of the receiver buffer in the first embodiment. At DTSn and DTSn+1, the predictive accumulation amount of the receiver buffer VBV exceeds the thresholds Tb1 and Tb2, and so the B-pictures are not skipped. However, at DTSn+2, the predictive accumulation amount of the receiver buffer VBV is below the threshold Tp, and so the P-picture is skipped.

Figure 14B:
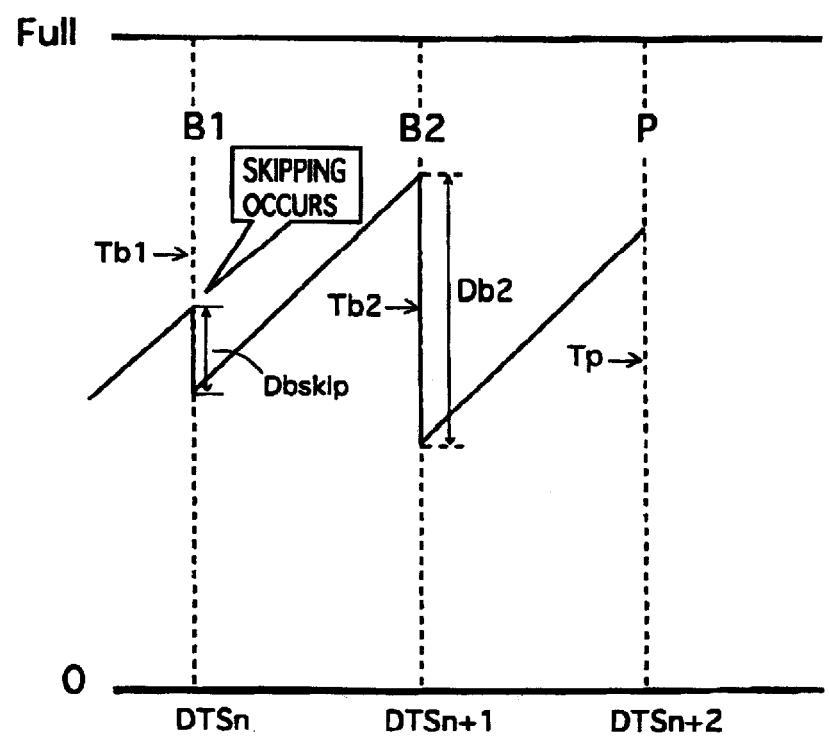
FIG. 14B shows the predictive accumulation amount of the receiver buffer for which the thresholds in the second embodiment are employed.

FIG. 14B shows changes of the predictive accumulation amount of the receiver buffer for which thresholds in the present embodiment are employed. As shown in the figure, the threshold Tb1 is set high, and so skipping a B1-picture occurs at DTSn. Due to this, the predictive accumulation amount of the receiver buffer VBV increases by a difference between the generation bit amount of the B1-picture and the generation bit amount of an all-skip B-picture (Db1−Dskip), and so the predictive accumulation amount of the receiver buffer VBV is at least the threshold Tp at DTSn+2. Therefore, skipping the P-picture does not occur at DTSn+2.

FIG. 15A shows examples of images displayed by the decoding apparatus in a normal case. A first frame, a second frame, a third frame, and a fourth frame respectively show original images of an I-picture(1), a B-picture(3), a B-picture(4), and a P-picture(2). Reference numerals in parentheses indicate the order in which the images are encoded.

FIG. 15B shows examples of images displayed by the decoding apparatus when a picture is judged to be skipped based on the thresholds employed in the first embodiment. As the thresholds in the first embodiment are not set in such a manner that a B-picture preceding a P-picture is more likely to be skipped than a P-picture, a P-picture is likely to be skipped. In this case, when the P-picture (2) is skipped, an original image of the I-picture(1) is displayed in the fourth frame as it is a reference image for the P-picture(2). As the B-picture(3) and the B-picture(4) refer to an original image of the P-picture(2), the original image of the I-picture (1) is also displayed in the second frame and the third frame.

FIG. 15C shows examples of images displayed by the decoding apparatus when a picture is judged to be skipped based on the thresholds employed in the present embodiment. As the thresholds in the present embodiment are set in such a manner that a B-picture preceding a P-picture is more likely to be skipped than a P-picture, a B-picture is likely to be skipped. In this case, when the B-picture(3) in the second frame is skipped, an original image of the I-picture(1) is displayed in the second frame as original images of the I-picture(1) and the P-picture(2) are reference images for the B-picture(3), and the I-picture(1) is nearer to the B-picture (3) in terms of the encoding order. Since no picture refers to the B-picture(3), original images of the other pictures are displayed in the normal way.

FIG. 15D shows examples of images displayed by the decoding apparatus when a picture is judged to be skipped based on the thresholds employed in the present embodiment. In this case, when the B-picture(4) in the third frame is skipped, an original image of the P-picture(2) is displayed in the third frame as original images of the I-picture(1) and the P-picture (2) are reference images for the B-picture(4), and the P-picture(2) is nearer to the B-picture(4) in terms of the encoding order. Since no picture refers to the B-picture (2), original images of the other pictures are displayed as usual.

(Operation)

An operation of the video encoding apparatus in the present embodiment is the same as that in the first embodiment shown in FIG. 11, with the only difference being in step S501, and so the operation procedures are not explained.

(Conclusion)

As described above, the video encoding apparatus in the present embodiment sets the thresholds so as to satisfy such predictive conditions that do not cause skipping of a P-picture. Therefore, in a case where a P-picture is normally skipped, a B-picture immediately preceding the P-picture is skipped instead, so that skipping the P-picture can be avoided.

(Modification 1)

The video encoding apparatus in the present embodiment has a unique feature to prevent a P-picture from being skipped, which is not provided in the first embodiment. Therefore, even when the video encoding apparatus in the present embodiment is constructed to temporarily store each picture in a buffer memory after generating the picture as disclosed in Japanese Patent No. 2871316, the video encoding apparatus in the present embodiment can produce an effect different from the disclosure of the above patent.

In detail, the video encoding apparatus may be constructed to encode image data so as to generate a picture, temporarily store the generated picture in the buffer memory, and sets a threshold according to a picture type of the picture, in such a manner that a P-picture is not skipped as described below, based on the generation bit amount of the picture, and the threshold set in this manner may be used for the judgment whether the picture is to be skipped.

The threshold Ti used in a case where the image data is encoded to generate an I-picture may be set according to the following equation, where Di represents the generation bit amount of the I-picture.

$$Ti=Di$$

Also, the threshold Tp used in a case where the image data is encoded to generate a P-picture may be set according to the following equation, where Dp represents the generation bit amount of the P-picture.

$$Tp=Dp$$

Also, the threshold Tb(i) used in a case where the image data is encoded to generate a B-picture immediately preceding an I-picture may be set according to the following equation to prevent the I-picture from being skipped. In the equation, Db represents the generation bit amount of the B-picture, Ei represents the predictive code amount of the I-picture, and R represents the transmission bit amount during each decoding time interval.

$$Tb(i)=MAX(Db, Db+(Ei-R))$$

Also, the threshold Tb(p) used in a case where the image data is encoded to generate a B-picture immediately preceding a P-picture may be set according to the following equation to prevent the P-picture from being skipped. In the equation, Db represents the generation bit amount of the B-picture, Ep represents a predictive code amount of the P-picture, and R represents the transmission bit amount during each decoding time interval.

$$Tb(p)=MAX(Db, Db+(Ep-R))$$

(Modification 2)

FIG. 16 shows other examples of setting the thresholds.

The thresholds Ti, Tp, Tb2(p), and Tb2(i) are set in the same way as in the second embodiment using the following equations.

$$Ti=Ei$$

$$Tp=Ep$$

$$Tb2(p)=MAX(Eb, Eb+(Ep-R))$$

$$Tb2(i)=MAX(Eb, Eb+(Ei-R))$$

In the second embodiment, since the threshold for a B1-picture is set high as described above, the B1-picture is likely to be skipped. However, in a case where the amounts of bits actually generated for a B1-picture, a B2-picture and a P-picture are smaller than the predictive code amounts thereof, the P-picture is not to be skipped contrary to the prediction. In such a case, the B1-picture does not need to be skipped. Accordingly, It is preferable to postpone the judgment whether to skip pictures until the B2-picture immediately preceding the P-picture, to see if skipping is really necessary. By doing so, unnecessary skipping can be avoided On the other hand, when the judgment is postponed as mentioned above and the B2-picture is judged to be skipped, skipping the B2-picture may not produce an enough effect to prevent the P-picture from being skipped if the predictive accumulation amount of the receiver buffer is extremely small.

Accordingly, the B1-picture is to be skipped only when skipping of the P-picture still occurs even though the B2-picture has been skipped. A threshold for the BP-picture is to be determined to make this happen.

Figure 17:
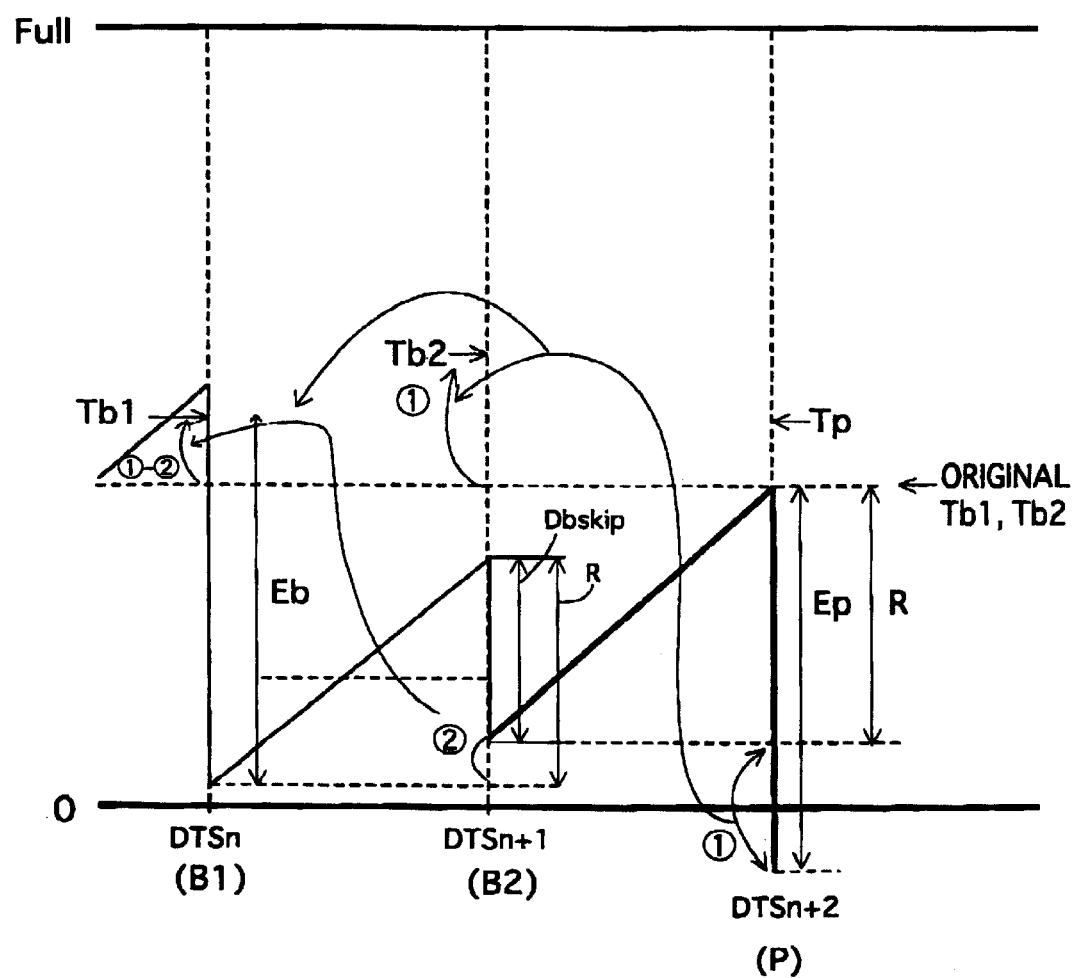
FIG. 17 is a diagram for explaining a threshold for a B-picture immediately preceding a P-picture in a modification of the second embodiment.

FIG. 17 is a diagram for explaining a threshold for a B-picture immediately preceding a P-picture.

Assuming the predictive accumulation amount of the receiver buffer VBV at DTSn as VBV(n), the predictive accumulation amount of the receiver buffer VBV at DTSn+2 is "VBV(n+2)=VBV(n)−Eb+R−Dbskip+R=VBV(n)−Eb−(Dbskip−2R)". Here, "Dbskip" represents the generation bit amount of an all-skip B-picture. When "VBV(n+2)≧Tp", the P-picture is not skipped at DTSn+2. The above expressions are transformed into an expression "VBV(n+2)=VBV(n) −Eb−(Dbskip−2R)≧Tp=Ep", and so it is found that an expression "VBV(n)≧Eb+(Ep+Dbskip−2R)=Eb+(Ep−R)+(Dbskip−R)=Dbskip+(Tb2−R)" needs to be satisfied.

Also, an expression "VBV(n)≧Eb" needs to be satisfied as in the first embodiment, and so an expression "VBV(n)≧MAX(Eb, Dbskip+(Tb2−R))" needs to be satisfied.

Accordingly, the threshold Tb1 is set as "Tb1=MAX (Eb, Dbskip+(Tb2−R))". When the predictive accumulation amount of the receiver buffer VBV is below the threshold Tb1 at DTSn, a B1-picture is skipped, so that the P-picture is not skipped in prediction.

This means as follows. When "Dbskip+(Tb2−R)≧0", a value "(Ep−R)" (a value equivalent to ① in FIG. 17) is added to an original threshold Tb1 and a value "(R−Dbskip)" (a value equivalent to ② in FIG. 17) is subtracted from the resulting value so as to obtain a new threshold Tb1 as shown in FIG. 17. When "Dbskip+(Tb2−R)<0", the original threshold Tb1 is used.

A threshold for a B-picture immediately preceding an I-picture can be set in the same manner as described above except that Ei is used instead of Ep, and so the following equations are obtained.

$$Tb1 (p)=MAX(Eb, Dbskip+(Tb2 (p)-R))$$

$$Tb1 (i)=MAX(Eb, Dbskip+(Tb2 (i)-R))$$

<Third Embodiment>

The present embodiment relates to a video encoding apparatus that does not cause a reversal in the order of images displayed in the interlaced scan format when encoding image data is skipped, in a case where one frame is allocated to one picture (frame structure).

(Construction)

The video encoding apparatus relating to the present embodiment has approximately the same construction as in the above embodiments, and so the following explanation focuses on differences therebetween.

The image arranging unit 110 arranges image data on a frame basis.

The DCT unit 113 encodes the image data on a frame basis.

The comparing/judging unit 125 has the DCT unit 113 cancel the encoding process on image data of a next frame and output an all-skip picture from the SKIP picture storage memory 126 when the predictive accumulation amount of the receiver buffer is below a threshold, as in the first embodiment.

The SKIP picture storage memory 126 stores two types of all-skip P-pictures and two types of all-skip B-pictures for the frame structure, the two types of all-skip P-pictures or the two types of all-skip B-pictures respectively referring to a bottom field of a forward picture (an immediately preceding field in the display order) and a top field of a backward picture (an immediately following field in the display order). The comparing/judging unit 125 selects, out of the two types, an all-skip picture that refers to a field which is nearest to a field of skipped image data in terms of the display order, and the selected all-skip picture is transmitted.

FIG. 18 shows a picture header and a picture coding extension in a picture layer of an all-skip B-picture. As shown by the reference numeral ① in the figure, the picture structure of the all-skip B-picture is designated as a top field.

Figure 19A:
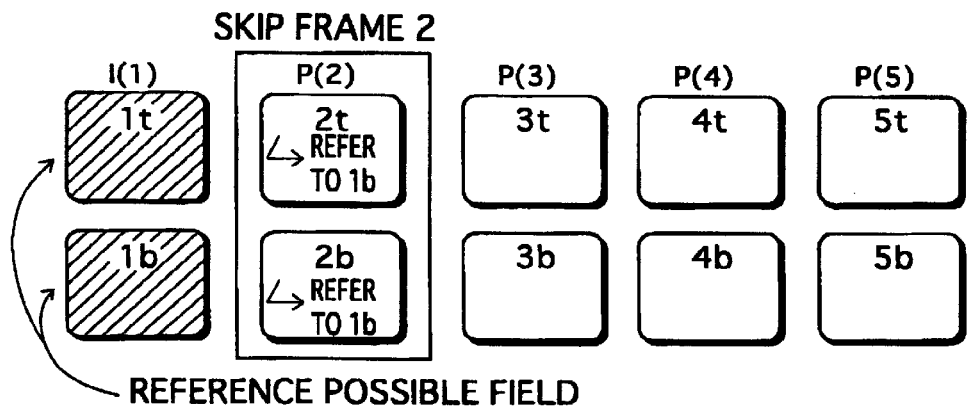
FIG. 19A shows a case where M=1 (where M represents an appearance cycle of an I-picture or a P-picture)
Figure 19B:
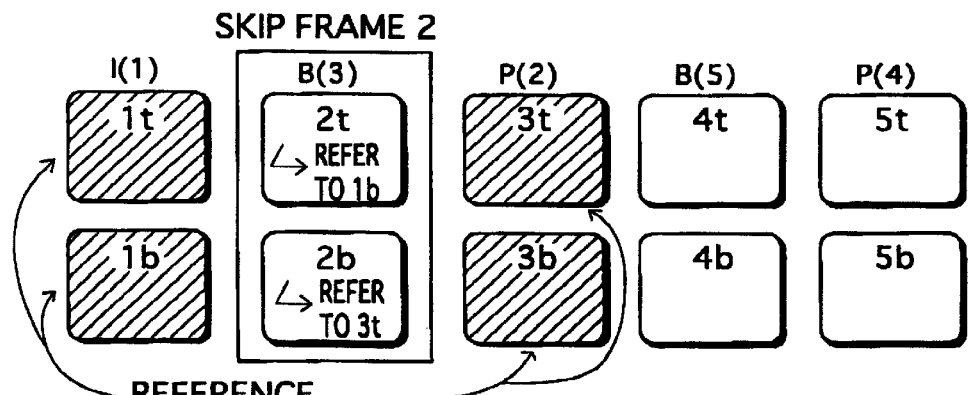
FIG. 19B shows a case where M=2 (where M represents an appearance cycle of an I-picture or a P-picture)
Figure 19C:
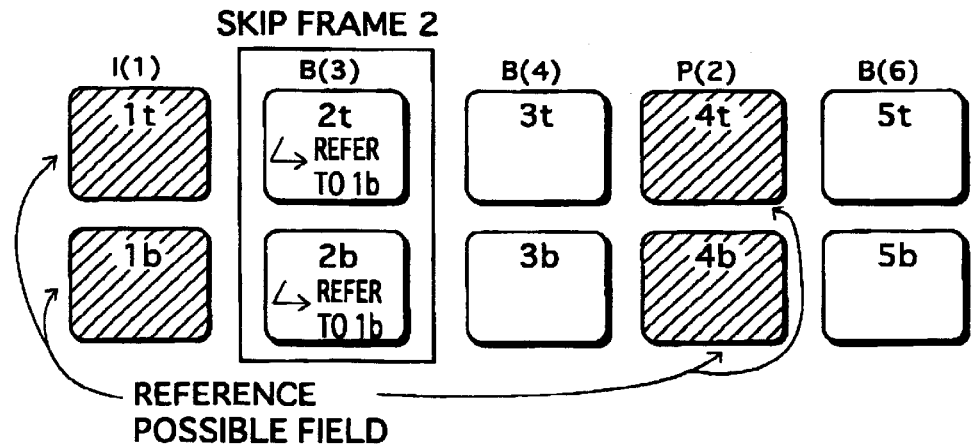
FIG. 19C shows a case where M=3 (where M represents an appearance cycle of an I-picture or a P-picture)

FIGS. 19A, 19B and 19C each show fields to be referred to when the frame 2 is skipped.

FIG. 19A shows a case where M=1 (where M represents an appearance cycle of an I-picture or a P-picture). As the frame 2 is a P-picture, fields that can be used as reference fields are fields 1t and 1b. As the field 1b is nearer to both fields 2t and 2b of the frame 2 in terms of the display order, the field 1b is a reference field for the fields 2t and 2b.

Accordingly, instead of encoding the fields 1t and 1b, two all-skip P-pictures that each refer to the bottom field of the forward picture are outputted.

FIG. 19B shows a case where M=2 (where M represents an appearance cycle of an I-picture or a P-picture). As the frame 2 is a B-picture, fields that can be used as reference fields are fields 1t, 1b, 3t, and 3b. As the field 1b is nearest to a field 2t in terms of the display order, the field 1b is a reference field for the field 2t. Also, as the field 3t is nearest to a field 2b, the field 3t is a reference field for the field 2b.

Accordingly, instead of encoding the field 2t, an all-skip B-picture that refers to a bottom field of the forward picture is outputted.

Instead of encoding the field 2b, an all-skip B-picture that refers to the top field of the backward picture is outputted.

FIG. 19C shows a case where M=3 (where M represents an appearance cycle of an I-picture or a P-picture). As the frame 2 is a B-picture, fields that can be used as reference fields are fields 1t, 1b, 4t, and 4b. As the field 1b is nearest to both fields 2t and 2b in terms of the display order, the field 1b is a reference field for the fields 2t and 2b.

Accordingly, instead of encoding the fields 2t and 2b, two all-skip B-pictures that each refer to the bottom field of the forward picture are outputted.

Figure 20A:
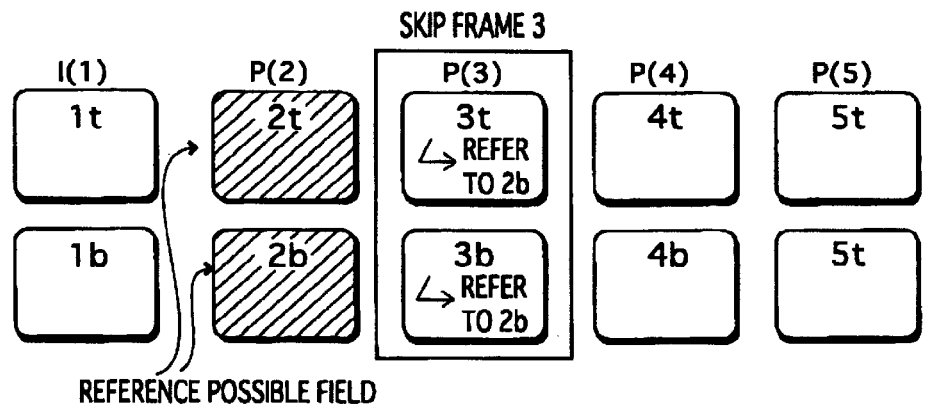
FIG. 20A shows a case where M=1 (where M represents an appearance cycle of an I-picture or a P-picture)
Figure 20B:
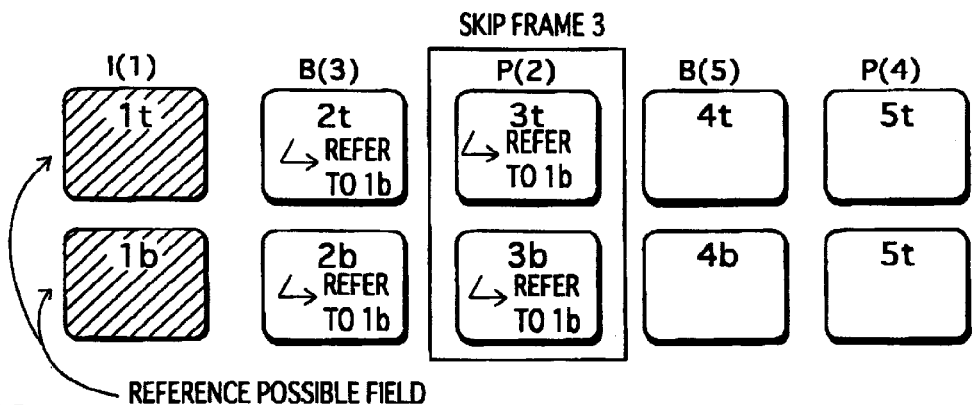
FIG. 20B shows a case where M=2 (where M represents an appearance cycle of an I-picture or a P-picture)
Figure 20C:
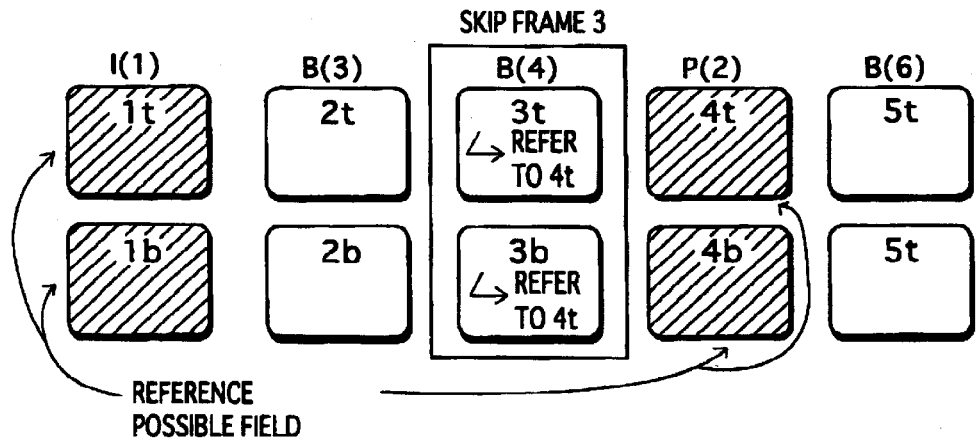
FIG. 20C shows a case where M=3 (where M represents an appearance cycle of an I-picture or a P-picture)

FIGS. 20A, 20B, and 20C each show fields to be referred to when the frame 3 is skipped.

FIG. 20A shows a case where M=1 (where M represents an appearance cycle of an I-picture or a P-picture). As the frame 3 is a P-picture, fields that can be used as reference fields are fields 2t and 2b. As the field 2b is nearer to both fields 3t and 3b of the frame 3 in terms of the display order, the field 2b is a reference field for the fields 3t and 3b.

Accordingly, instead of encoding the fields 3t and 3b, two all-skip P-pictures that each refer to the bottom field of the forward picture are outputted.

FIG. 20B shows a case where M=2 (where M represents an appearance cycle of an I-picture or a P-picture). As the frame 3 is a B-picture, fields that can be used as reference fields are fields it and 1b. As the field 1b is nearer to both fields 3t and 3b in terms of the display order, the field 1b is a reference field for the fields 3t and 3b.

Accordingly, instead of encoding the fields 3t and 3b, two all-skip B-pictures that each refer to the bottom field of the forward picture are outputted.

Also, since the field 1b is displayed instead of the field 3t, the fields 2t and 2b are also skipped using the field 1b as a reference field to prevent the display order from being reversed. In this case, too, two all-skip pictures that each refer to the bottom field of the forward picture is outputted.

FIG. 20C shows a case where M=3 (where M represents an appearance cycle of an I-picture or a P-picture). As the frame 3 is a B-picture, fields that can be used as reference fields are fields 1t, 1b, 4t, and 4b. As the field 4t is nearest to both fields 3t and 3b in terms of the display order, the field 4t is a reference field for the fields 3t and 3b.

Accordingly, instead of encoding the fields 3t and 3b, two all-skip B-pictures that each refer to the top field of the backward picture are outputted.

Figure 21:
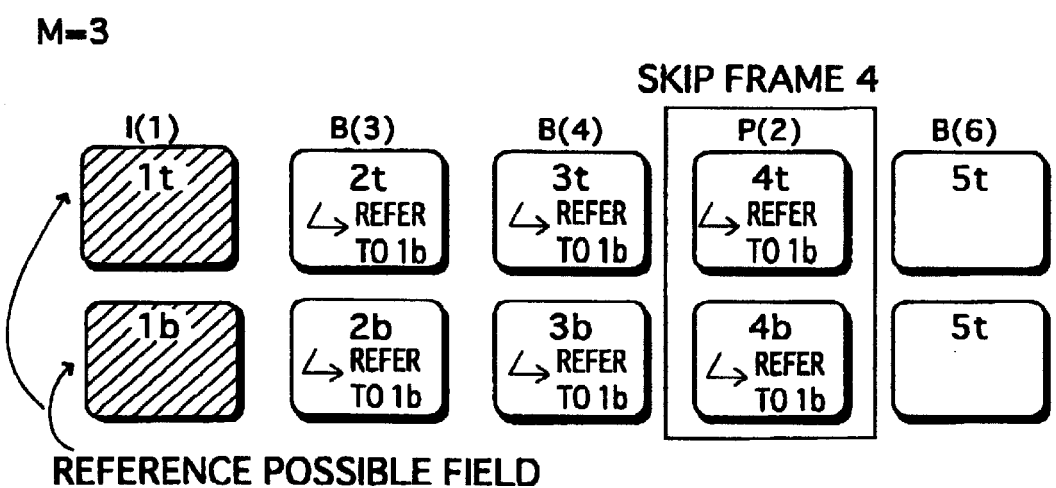
FIG. 21 shows a case where M=3 (where M represents an appearance cycle of an I-picture or a P-picture) and a frame 4 is skipped.

FIG. 21 shows a case where M=3 (where M represents an appearance cycle of an I-picture or a P-picture). As the frame 4 is a P-picture, fields that can be used as reference fields are fields 1t and 1b. As the field 1b is nearer to both fields 4t and 4b in terms of the display order, the field 1b is a reference field for the fields 4t and 4b.

Accordingly, instead of encoding the fields 4t and 4b, two all-skip P-pictures that each refer to the bottom field of the forward picture are outputted.

Also, since the field 1b is displayed instead of the field 4t, the fields 2t, 2b, 3t, and 3b are also skipped using the field 1b as a reference field to prevent the display order of images from being reversed. In this case, too, four all-skip pictures that each refer to the bottom field of the forward picture are outputted.

(Operation)

The following is an explanation of an operation of the video encoding apparatus relating to the present embodiment.

Figure 22A:
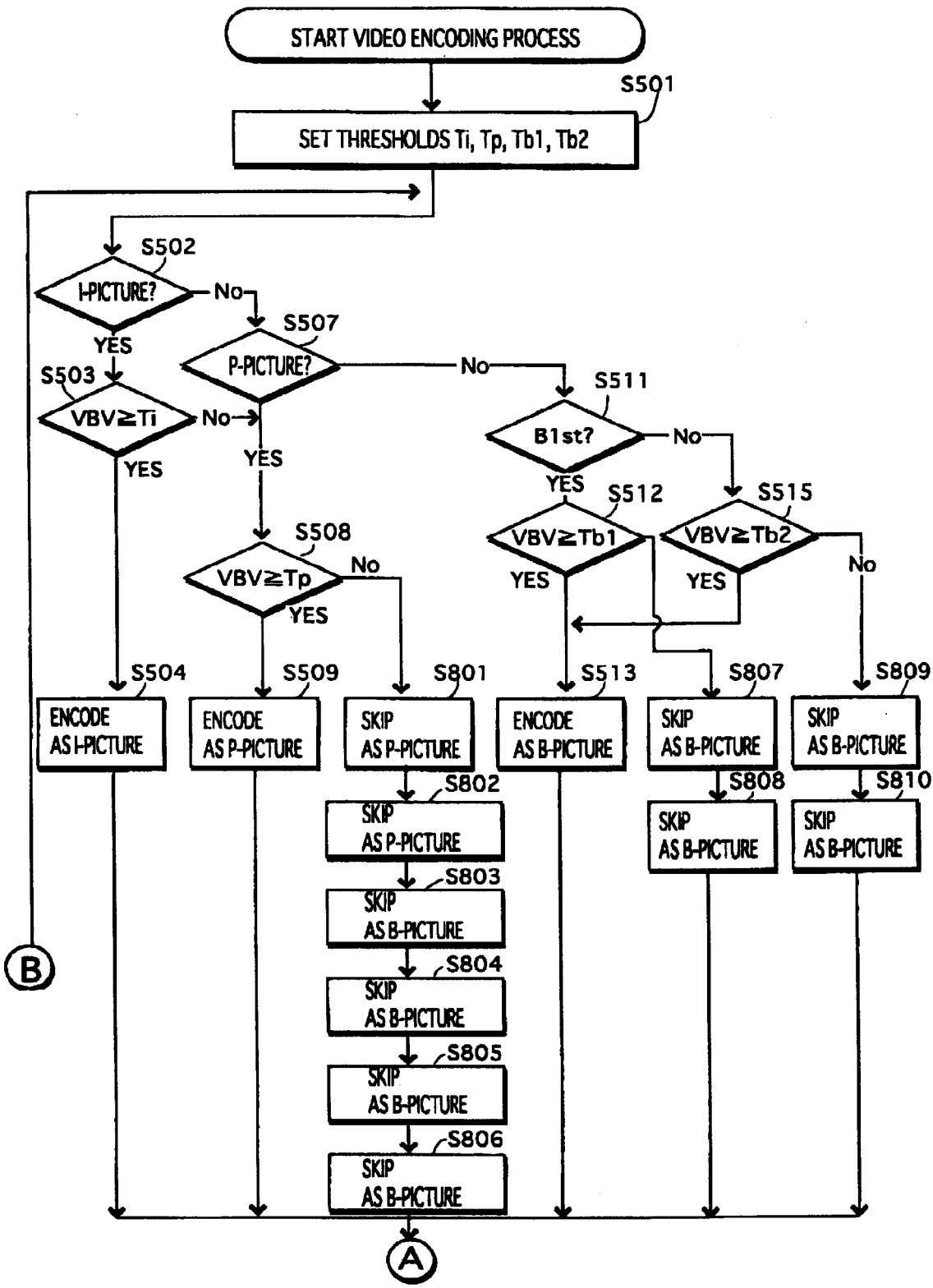
FIG. 22A is a flowchart showing operation procedures of a video encoding apparatus relating to the third embodiment of the present invention (to be continued to FIG. 22B)
Figure 22B:
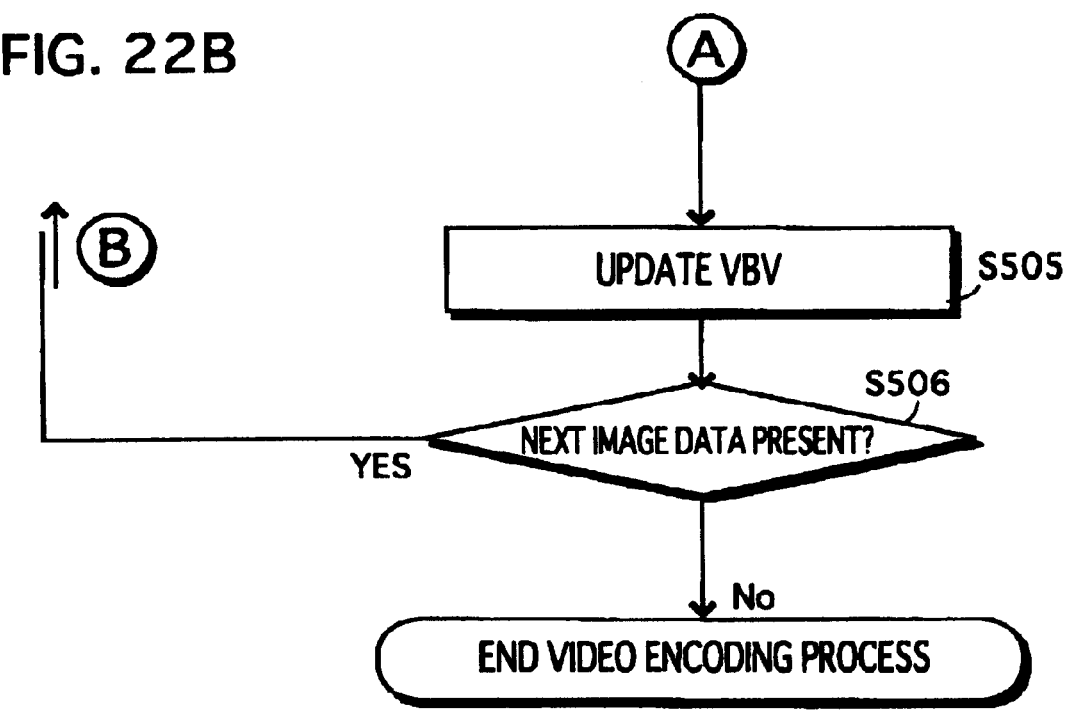
FIG. 22B is a flowchart showing operations procedures of the video encoding apparatus relating to the third embodiment of the present invention.

FIG. 22 is a flowchart showing operation procedures performed by the video encoding apparatus relating to the present embodiment.

Operation procedures relating to setting thresholds (step S501), the judgment as to whether pictures are skipped or not (steps S502, S503, S507, S508, S511, S512, and S515), the encoding process of an I-picture (step S504), the encoding process of a P-picture (step S509), and the encoding process of a B-picture (step S513) are not explained here as they are the same as in the first embodiment.

The present embodiment differs from the first embodiment in methods for skipping pictures shown in steps S801 to S810, and so the following explains the differences.

In the present embodiment, when encoding of image data is skipped, the allocation of pictures is changed from the frame structure to the field structure, and so two all-skip pictures respectively for the top field and the bottom field that make up the image data are outputted. That is to say, skipping of a picture is performed twice.

When "VBV<Tb1" in step S512, an all-skip B-picture that refers to the bottom field of the forward picture is outputted twice in steps S807 and S808 (see FIG. 19C for reference examples).

When "VBV<Tb2" in step S515, an all-skip B-picture that refers to the top field of the backward picture is outputted twice in steps S809 and S810 (see FIG. 20C for reference examples).

When "VBV<Tp" in step S508, an all-skip P-picture that refers to the bottom field of the forward picture is outputted twice in steps S801 and S802 (see FIG. 21 for reference examples).

In steps S803 to S806, instead of a B-picture between a P-picture and an I-picture that is referred to by the P-picture, two all-skip B-pictures that each refer to the bottom field of the forward picture are outputted (see FIG. 21 for reference examples).

In step S505, the receiver buffer accumulation predicting unit 124 calculates, based on (a) one of the generation bit amount of the picture, the generation bit amount of two or six all-skip pictures, and (b) the transmission bit amount during each DTS time interval R, the predictive accumulation amount of the receiver buffer VBV prior to decoding at the next DTS.

(Conclusion)

According to the video encoding apparatus relating to the present embodiment, as described above, when the predictive accumulation amount of the receiver buffer is below a threshold, encoding image data in the frame structure is cancelled and all-skip pictures having the field structure that each refer to a nearest field in terms of the display order are outputted, in a case where one frame is allocated to one picture (frame structure). Therefore, when images are displayed in the interlaced scan format in a case where encoding image data is skipped, the display order of the images is not reversed.

(Modification)

The video encoding apparatus relating to the present embodiment performs the judgment whether to skip each picture based on the predictive accumulation amount of the receiver buffer, however, the invention should not be limited to such. For instance, the above judgment may be performed based on the accumulation amount of an output buffer of the video encoding apparatus.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A video encoding apparatus that encodes a sequence of image data while predicting an accumulation amount of a receiver buffer in a decoding apparatus, each image data forming one frame or one field, the video encoding apparatus comprising:

comparing means for comparing, prior to encoding of each image data, a predictive accumulation amount with a predetermined threshold, the predictive accumulation amount being an amount of data predicted to be accumulated in the receiver buffer by the time when data obtained by encoding the image data is decoded; and skipping means for (a) canceling the encoding of the image data and (b) using a proxy code as data that is fetched from the receiver buffer at the decoding time, if the amount of data is below the predetermined threshold, the proxy code indicating to display image data that is identical to previously decoded image data.

2. The video encoding apparatus of claim 1, further comprising threshold setting means for setting a threshold for a picture type of a picture that is obtained by encoding the image data, the picture type being one of an I-picture, a P-picture, and a B-picture.

3. The video encoding apparatus of claim 2, wherein the skipping means (a) uses an all-skip B-picture as the proxy code when the picture type is a B-picture, the all-skip B-picture being a B-picture in which macroblocks in all slice layers except a first macroblock and a last macroblock in each slice layer are skipped macroblocks, and (b) uses an all-skip P-picture as the proxy code when the picture type is an I-picture or a P-picture, the all-skip P-picture being a P-picture in which macroblocks in all slice layers except a first macroblock and a last macroblock in each slice layer are skipped macroblocks.

4. The video encoding apparatus of claim 3, wherein the threshold is a predictive code amount of the picture.

5. The video encoding apparatus of claim 3, wherein the threshold setting means calculates a variance of pixel values of the image data, and sets a higher threshold for a higher calculated variance.

6. The video encoding apparatus of claim 3, wherein the threshold setting means sets a higher threshold for a higher activity ACT of an original image, the activity ACT being a sum of activities act of all macroblocks included in the original image, an activity act being expressed by the equation $$act_j = 1 + VAR_j$$

where $VAR_j$ is a minimum value among variances of pixel values of the original image in each of eight blocks that form a macroblock j, the eight blocks being composed of four blocks in a frame DCT mode and four blocks in a field DCT mode, and act is an activity of the macroblock j.

7. The video encoding apparatus of claim 3, wherein the threshold setting means sets a predictive code amount of each of an I-picture and a P-picture as the threshold for each of an I-picture and a P-picture, and sets a value larger than a predictive code amount of a B-picture as the threshold for a B-picture.

8. The video encoding apparatus of claim 7, wherein when M≧2, M representing an appearance cycle of an I-picture or a P-picture, the threshold setting means sets:

a threshold Ti of an I-picture as Ti=Ei;

a threshold Tp of a P-picture as Tp=Ep;

a threshold Tb(i) of a B-picture immediately preceding an I-picture in an encoding order as Tb(i)=Eb+(Ei−R) when (Ei−R)≧0, and Tb(i)=Eb when (Ei−R)<0; and a threshold Tb(p) of a B-picture immediately preceding a P-picture in the encoding order as Tb(p)=Eb+(Ep−R) when (Ep−R)≧0, and Tb(p)=Eb when (Ep−R)<0, where Ei is the predictive code amount of an I-picture, Ep is the predictive code amount of a P-picture, Eb is the predictive code amount of a B-picture, and R is a transmission bit amount during each decoding time interval.

9. The video encoding apparatus of claim 7, wherein when M≧3, M representing an appearance cycle of an I-picture or a P-picture, the threshold setting means sets:

a threshold Ti of an I-picture as Ti=Ei;

a threshold Tp of a P-picture as Tp=Ep;

a threshold Tb2(i) of a B-picture B2(i) immediately preceding an I-picture in an encoding order as Tb2(i)= Eb+(Ei−R) when (Ei−R)≧0, and Tb2(i)=Eb when (Ei−R) <0;

a threshold Tb1(i) of a B-picture B1(i) immediately preceding a B-picture B2(i) in the encoding order as Tb1(i)=Eb+(Tb2(i)−R) when (Tb2(i)−R)≧0, and Tb1(i)=Eb when (Tb2(i)−R)<0;

a threshold Tb2(p) of a B-picture B2(p) immediately preceding a P-picture in the encoding order as Tb2(p)= Eb+(Ep−R) when (Ep−R)≧0, and Tb2(p)=Eb when (Ep−R)<0; and a threshold Tb1(p) of a B-picture B1(p) immediately preceding a B-picture B2(p) in the encoding order as Tb1(p)=Eb+(Tb2(p)−R) when (Tb2(p)−R)≧0, and Tb1(p)=Eb when (Tb2(p)−R)<0, where Ei is the predictive code amount of an I-picture, Ep is the predictive code amount of a P-picture, Eb is the predictive code amount of a B-picture, and R is a transmission bit amount during each decoding time interval.

10. The video encoding apparatus of claim 7, wherein when M≧3, M representing an appearance cycle of an I-picture or a P-picture, the threshold setting means sets the threshold of a B-picture B2 immediately preceding an I-picture in an encoding order, higher than the threshold of a B-picture B1 immediately preceding the B-picture B2 in the encoding order.

11. The video encoding apparatus of claim 10, wherein when M≧3, M representing an appearance cycle of an I-picture or a P-picture, the threshold setting means sets:

a threshold Ti of an I-picture as Ti=Ei;

a threshold Tp of a P-picture as Tp=Ep;

a threshold Tb2(i) of a B-picture B2(i) immediately preceding an I-picture in an encoding order as Tb2(i)= Eb+(Ei−R) when (Ei−R)≧0, and Tb2(i)=Eb when (Ei−R)<0;

a threshold Tb1(i) of a B-picture B1(i) immediately preceding a B-picture B2(i) in the encoding order as $Tb1(i)=Dbskip+(Tb2(i)-R)$ when $Dbskip+(Tb2(i)-R) \geq Eb$, and $Tb1(i)=Eb$ when $Dbskip+(Tb2(i)-R)<Eb$;

a threshold $Tb2(p)$ for a B-picture $B2(p)$ immediately preceding a P-picture in the encoding order as $Tb2(p)= Eb+(Ep-R)$ when $(Ep-R) \geq 0$, and $Tb2(p)=Eb$ when $(Ep-R)<0$; and a threshold $Tb1(p)$ of a B-picture $B1(p)$ immediately preceding a B-picture $B2(p)$ in the encoding order as $Tb1(p)=Dbskip+(Tb2(p)-R)$ when $Dbskip+(Tb2(p)-R) \geq Eb$, and $Tb1(p)=Eb$ when $Dbskip+(Tb2(p)-R)<Eb$ where Ei is the predictive code amount of an I-picture, Ep is the predictive code amount of a P-picture, Eb is the predictive code amount of a B-picture, R is a transmission bit amount during each decoding time interval, and Dbskip is a code amount of an all-skip B-picture.

12. A video encoding apparatus that encodes a sequence of image data while predicting an accumulation amount of a receiver buffer in a decoding apparatus, each image data forming one frame or one field, the video encoding apparatus comprising:

threshold setting means for setting, after encoding each image data, a threshold according to a picture type of the encoded image data in a case where $M \geq 2$, M representing an appearance cycle of an I-picture or a P-picture, as the following, a threshold Ti in a case where the image data is encoded to be an I-picture is set as $Ti=Di$, where Di is a predictive code amount of the I-picture, a threshold Tp in a case where the image data is encoded to be a P-picture is set as $Tp=Dp$, where Dp is a predictive code amount of the P-picture, a threshold $Tb(i)$ in a case where the image data is encoded to be a B-picture immediately preceding an I-picture in an encoding order is set as $Tb(i)=Dp+(Ei-R)$ when $(Ei-R) \geq 0$, and $Tb(i)=Dp$ when $(Ei-R)<0$, where Db is a predictive code amount of the B-picture, Ei is a predictive code amount of the I-picture, and R is a transmission bit amount during each decoding time interval, and a threshold $Tb(p)$ in a case where the image data is encoded to be a B-picture immediately preceding a P-picture in the encoding order is set as $Tb(p)=Dp+ (Ep-R)$ when $(Ep-R) \geq 0$, and $Tb(p)=Dp$ when $(Ep-R)<0$, where Db is a predictive code amount of the B-picture, Ep is a predictive code amount of the P-picture, and R is a transmission bit amount during each decoding time interval;

comparing means for comparing, after encoding the image data, a predictive accumulation amount with the threshold, the predictive accumulation amount being an amount of data predicted to be accumulated in the receiver buffer by the time when data obtained by encoding the image data is decoded; and skipping means for using a proxy code as data that is fetched from the receiver buffer at the decoding time, if the amount of data is below the threshold, the proxy code indicating to display image data that is identical to previously decoded image data.

13. A video encoding apparatus that encodes a sequence of image data in a frame structure, each image data forming one frame, comprising:

comparing means for comparing, prior to encoding of each image data, one of (a) a predictive accumulation amount of a receiver buffer in a decoding apparatus and (b) an accumulation amount of an output buffer, with a predetermined standard value, the predictive accumulation amount being an amount of data predicted to be accumulated in the receiver buffer;

skipping means for (a) canceling the encoding of the image data in the frame structure and (b) substituting a proxy code indicating to display two fields that each are identical to one of a top field and a bottom field of previously decoded image data, for data that is obtained by encoding a top field and a bottom field of the image data, if the amount of data is below the predetermined standard value.

14. The video encoding apparatus of claim 13, wherein the skipping means uses the proxy code indicating to display the two fields that each are identical to the field that is the nearest, in a display order, to each of the top field and the bottom field of the image data which has been canceled to be encoded in the frame structure, the field being selected out of the top field and the bottom field of the previously decoded image data.

15. The video encoding apparatus of claim 14, wherein when the image data which has been canceled to be encoded in the frame structure is encoded to be a B-picture, the skipping means uses two all-skip B-pictures that each are a B-picture in which macroblocks in all slice layers except a first macroblock and a last macroblock in each slice layer are skipped macroblocks as the proxy code, and when the image data which has been canceled to be encoded in the frame structure is encoded to be an I-picture or a P-picture, the skipping means uses two all-skip P-pictures that each are a P-picture in which macroblocks in all slice layers except a first macroblock and a last macroblock in each slice layer are skipped macroblocks as the proxy code.

16. The video encoding apparatus of claim 15, wherein (a) each all-skip P-picture used by the skipping means when the image data which has been canceled to be encoded in the frame structure is encoded to be an I-picture or a P-picture uses a bottom field of a previously displayed I-picture or P-picture as a reference field, (b) each all-skip B-picture used by the skipping means when the image data which has been canceled to be encoded in the frame structure is encoded to be a B-picture B1 uses a top field of a previously displayed I-picture or P-picture as a reference field, and (c) each all-skip B-picture used by the skipping means when the image data which has been canceled to be encoded in the frame structure is encoded to be a B-picture B2 uses a top field of a successively displayed I-picture or P-picture as a reference field.

17. The video encoding apparatus of claim 16, wherein when the image data which has been canceled to be encoded in the frame structure is encoded to be an I-picture or a P-picture, the skipping means cancels encoding of image data encoded to be a B-picture immediately following the I-picture or the P-picture in the display order, and substitutes two all-skip B-pictures that each use a bottom field of a previously displayed picture as a reference field, for data obtained by encoding the top field and the bottom field of the image data.

18. A video encoding apparatus that encodes a sequence image data while predicting an accumulation amount of a receiver buffer in a decoding apparatus, each image data forming one frame or one field, the video encoding apparatus comprising:

comparing means for comparing, prior to encoding of each image data, a predictive accumulation amount with a threshold, the predictive accumulation amount being an amount of data predicted to be accumulated in the receiver buffer by the time when data obtained by encoding the image data is decoded, the threshold being set for a picture type of a picture that is obtained by encoding the image data; and controlling means for (a) canceling the encoding of the image data and (b) using a proxy code as data that is fetched from the receiver buffer at the decoding time, if the amount of data is below the threshold and the picture type is a B-picture, the proxy code indicating to display image data that is identical to previously decoded image data.

19. A video encoding apparatus that encodes a sequence of image data while predicting an accumulation amount of a receiver buffer in a decoding apparatus, each image data forming one frame or one field, the video encoding apparatus comprising:

comparing means for comparing, prior to encoding of each image data, a predictive accumulation amount with a threshold, the predictive accumulation amount being an amount of data predicted to be accumulated in the receiver buffer by the time when data obtained by encoding the image data is decoded, the threshold being set for a picture type of a picture that is obtained by encoding the image data; and controlling means for (a) canceling the encoding of the image data and (b) using a proxy code as data that is fetched from the receiver buffer at the decoding time, if the amount of data is below the threshold and the picture type is a B-picture or a P-picture, the proxy code indicating to display image data that is identical to previously decoded image data.

20. A video encoding method for encoding a sequence of image data while predicting an accumulation amount of a receiver buffer in a decoding apparatus, each image data forming one frame or one field, the video encoding method comprising:

comparing step for comparing, prior to encoding of each image data, a predictive accumulation amount with a predetermined threshold, the predictive accumulation amount being an amount of data predicted to be accumulated in the receiver buffer by the time when data obtained by encoding the image data is decoded; and skipping step for (a) canceling the encoding of the image data and (b) using a proxy code as data that is fetched from the receiver buffer at the decoding time, if the amount of data is below the predetermined threshold, the proxy code indicating to display image data that is identical to previously decoded image data.

21. A video encoding method for encoding a sequence of image data in a frame structure, each image data forming one frame, comprising:

comparing step for comparing, prior to encoding of each image data, one of (a) a predictive accumulation amount of a receiver buffer in a decoding apparatus and (b) an accumulation amount of an output buffer, with a predetermined standard value, the predictive accumulation amount being an amount of data predicted to be accumulated in the receiver buffer;

skipping step for (a) canceling the encoding of the image data in the frame structure and (b) substituting a proxy code indicating to display two fields that each are identical to one of a top field and a bottom field of previously decoded image data, for data that is obtained by encoding a top field and a bottom field of the image data, if the amount of data is below the predetermined standard value.

22. A video encoding program for encoding a sequence of image data while predicting an accumulation amount of a receiver buffer in a decoding apparatus, each image data forming one frame or one field, the video encoding program comprising:

comparing step for comparing, prior to encoding of each image data, a predictive accumulation amount with a predetermined threshold, the predictive accumulation amount being an amount of data predicted to be accumulated in the receiver buffer by the time when data obtained by encoding the image data is decoded; and skipping step for (a) canceling the encoding of the image data and (b) using a proxy code as data that is fetched from the receiver buffer at the decoding time, if the amount of data is below the predetermined threshold, the proxy code indicating to display image data that is identical to previously decoded image data.

23. A video encoding program for encoding a sequence of image data in a frame structure, each image data forming one frame, comprising:

comparing step for comparing, prior to encoding of each image data, one of (a) a predictive accumulation amount of a receiver buffer in a decoding apparatus and (b) an accumulation amount of an output buffer, with a predetermined standard value, the predictive accumulation amount being an amount of data predicted to be accumulated in the receiver buffer;

skipping step for (a) canceling the encoding of the image data in the frame structure and (b) substituting a proxy code indicating to display two fields that each are identical to one of a top field and a bottom field of previously decoded image data, for data that is obtained by encoding a top field and a bottom field of the image data, if the amount of data is below the predetermined standard value.

* * * * *